United States Patent
Safai

(10) Patent No.: US 12,517,070 B2
(45) Date of Patent: Jan. 6, 2026

(54) INTEGRATED BACKSCATTER X-RAY ASSEMBLIES FOR DETECTING BACKSCATTER X-RAYS REFLECTED BY TARGET AREA OF ARTICLE UNDER TEST AND ASSOCIATED METHODS

(71) Applicant: The Boeing Company, Arlington, VA (US)

(72) Inventor: Morteza Safai, Newcastle, WA (US)

(73) Assignee: The Boeing Company, Arlington, VA (US)

( * ) Notice: Subject to any disclaimer, the term of this patent is extended or adjusted under 35 U.S.C. 154(b) by 259 days.

(21) Appl. No.: 18/494,132

(22) Filed: Oct. 25, 2023

(65) Prior Publication Data

US 2025/0137946 A1    May 1, 2025

(51) Int. Cl.
*G01N 23/203* (2006.01)
*G01N 23/20008* (2018.01)
(Continued)

(52) U.S. Cl.
CPC ..... *G01N 23/203* (2013.01); *G01N 23/20008* (2013.01); *H05G 1/025* (2013.01); *H05G 1/06* (2013.01); *G01N 2223/053* (2013.01); *G01N 2223/1016* (2013.01); *G01N 2223/304* (2013.01); *G01N 2223/3103* (2013.01); *G01N 2223/3303* (2013.01); *G01N 2223/41* (2013.01);
(Continued)

(58) Field of Classification Search
None
See application file for complete search history.

(56) References Cited

U.S. PATENT DOCUMENTS

| | | | |
|---|---|---|---|
| 3,505,520 A | 4/1970 | Stewart et al. | |
| 7,186,021 B1 * | 3/2007 | Breham | H01J 35/16 378/199 |

(Continued)

FOREIGN PATENT DOCUMENTS

| | | | | |
|---|---|---|---|---|
| CN | 106526688 A | * | 3/2017 | G01S 17/74 |
| EP | 3557233 A1 | | 10/2019 | |

OTHER PUBLICATIONS

European Patent Office, Extended European Search Report, App. No. 24193494.2 (Jan. 27, 2025).
(Continued)

*Primary Examiner* — Thomas R Artman
(74) *Attorney, Agent, or Firm* — Walters & Wasylyna LLC

(57) ABSTRACT

Integrated backscatter X-ray assemblies for detecting backscatter X-rays reflected by a target area of an article under test are disclosed. The integrated backscatter X-ray assembly includes an enclosure, an X-ray power supply, an X-ray tube, a backscatter X-ray detector and a cooling fluid. The X-ray power supply disposed within the enclosure. The X-ray tube disposed within the enclosure and operatively coupled to the X-ray power supply. The backscatter X-ray detector is disposed within the enclosure. The cooling fluid disposed within the enclosure such that the X-ray power supply, the X-ray tube and the backscatter X-ray detector are immersed in the cooling fluid. In various examples, integrated backscatter X-ray assemblies may also include a movable base and/or a mobile platform. Methods for detecting backscatter X-rays reflected by a target area of an article under test are also disclosed.

20 Claims, 20 Drawing Sheets

(51) Int. Cl.
*H05G 1/02* (2006.01)
*H05G 1/06* (2006.01)

(52) U.S. Cl.
CPC . *G01N 2223/615* (2013.01); *G01N 2223/631* (2013.01); *G01N 2223/633* (2013.01); *G01N 2223/646* (2013.01)

(56) References Cited

U.S. PATENT DOCUMENTS

| | | | |
|---|---|---|---|
| 8,094,781 B1 | 1/2012 | Safai et al. | |
| 8,761,338 B2 | 6/2014 | Safai | |
| 8,798,232 B2 * | 8/2014 | Bendahan | G01V 5/232 378/57 |
| 8,855,268 B1 * | 10/2014 | Safai | G01N 23/203 378/197 |
| 9,036,781 B1 * | 5/2015 | Safai | G01N 23/00 378/86 |
| 9,151,721 B2 | 10/2015 | Safai | |
| 9,851,312 B2 * | 12/2017 | Edwards | G21K 1/10 |
| 10,278,273 B2 * | 4/2019 | Marui | H05G 1/025 |
| 10,327,722 B2 * | 6/2019 | Karlstedt | H01L 23/473 |
| 10,794,843 B2 * | 10/2020 | Rothschild | G01N 23/203 |
| 11,119,058 B2 * | 9/2021 | Safai | G01N 23/20008 |
| 11,169,098 B2 * | 11/2021 | Safai | H01J 35/153 |
| 11,506,618 B1 | 11/2022 | Robideau et al. | |
| 12,135,299 B2 * | 11/2024 | Izumi | G01N 23/223 |
| 12,163,903 B2 * | 12/2024 | Safai | G01N 23/203 |
| 2011/0103548 A1 * | 5/2011 | Bendahan | G01N 23/203 378/57 |
| 2012/0321046 A1 | 12/2012 | Safai | |
| 2014/0064453 A1 | 3/2014 | Safai | |
| 2015/0194286 A1 * | 7/2015 | Karlstedt | H01L 23/473 378/62 |
| 2015/0323477 A1 * | 11/2015 | Edwards | G01N 23/203 378/87 |
| 2018/0007768 A1 * | 1/2018 | Marui | H05G 1/025 |
| 2019/0242834 A1 * | 8/2019 | Rothschild | G01N 23/20008 |
| 2020/0371049 A1 | 11/2020 | Safai | |
| 2021/0310967 A1 | 10/2021 | Safai | |
| 2022/0003693 A1 * | 1/2022 | Rothschild | G01N 23/203 |
| 2022/0365006 A1 | 11/2022 | Safai | |
| 2023/0057233 A1 * | 2/2023 | Izumi | G01N 23/2209 |
| 2025/0137946 A1 * | 5/2025 | Safai | G01N 23/203 |

OTHER PUBLICATIONS

RadalyX: "X-ray Robotic Imaging System, Non-Destructive Inspection," Radalytica brochure, www.radalytica.com (2020).

* cited by examiner

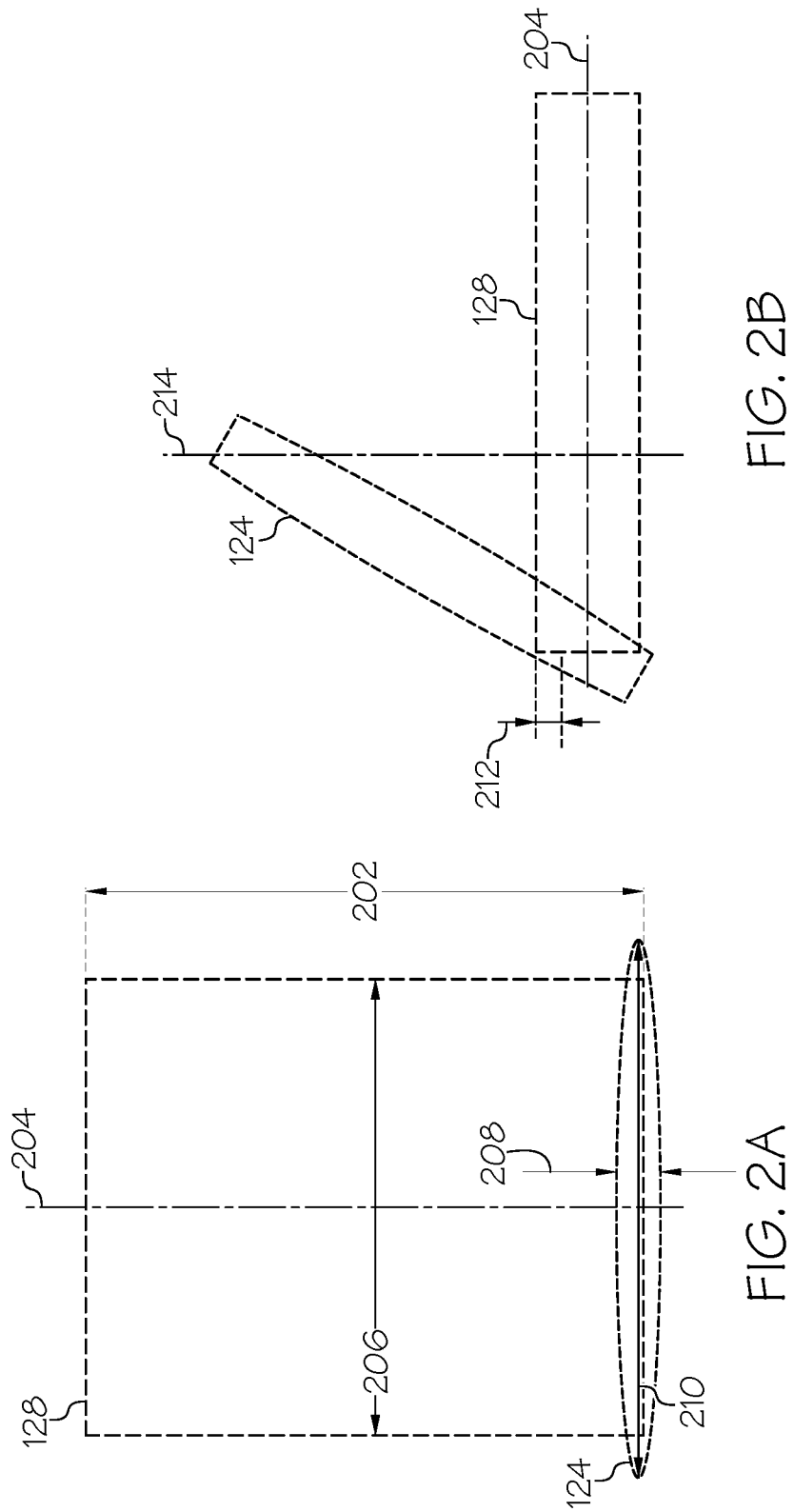

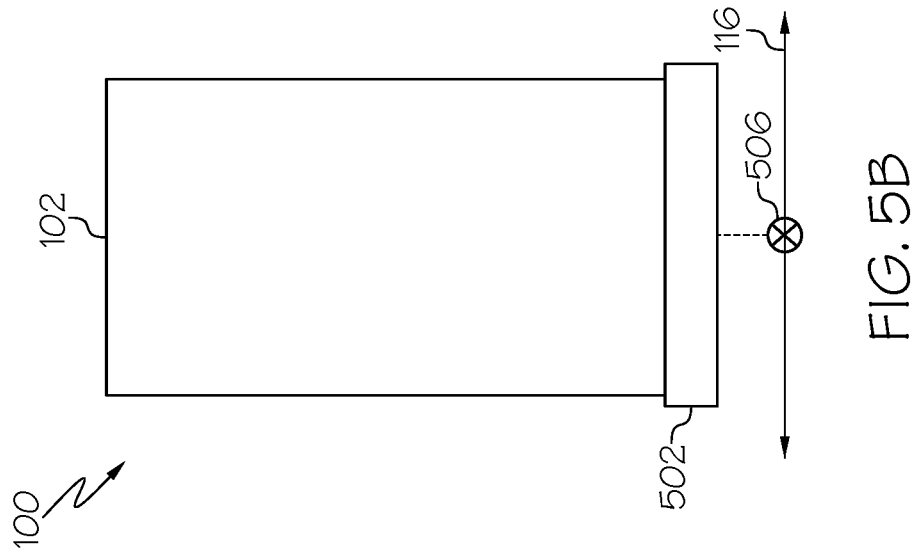
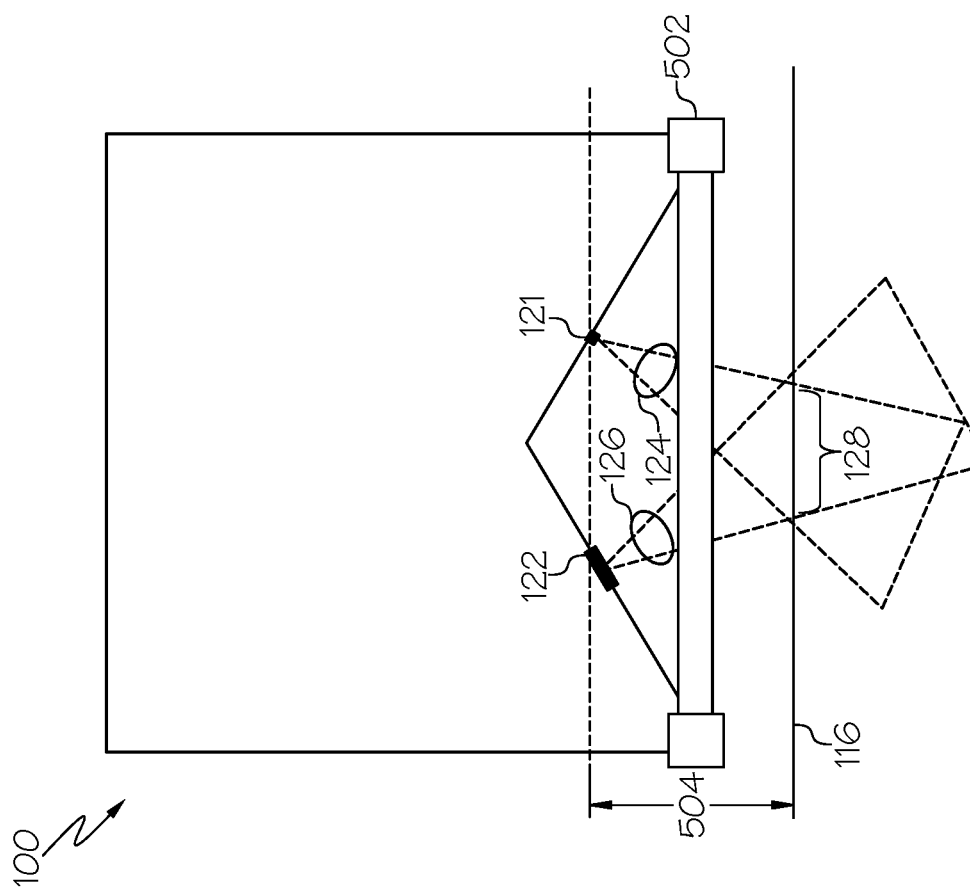

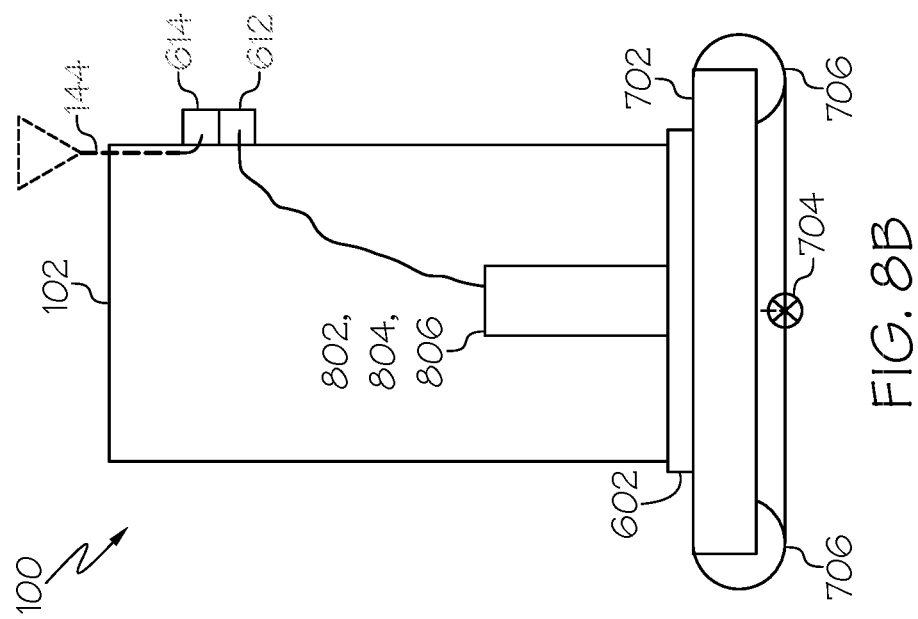
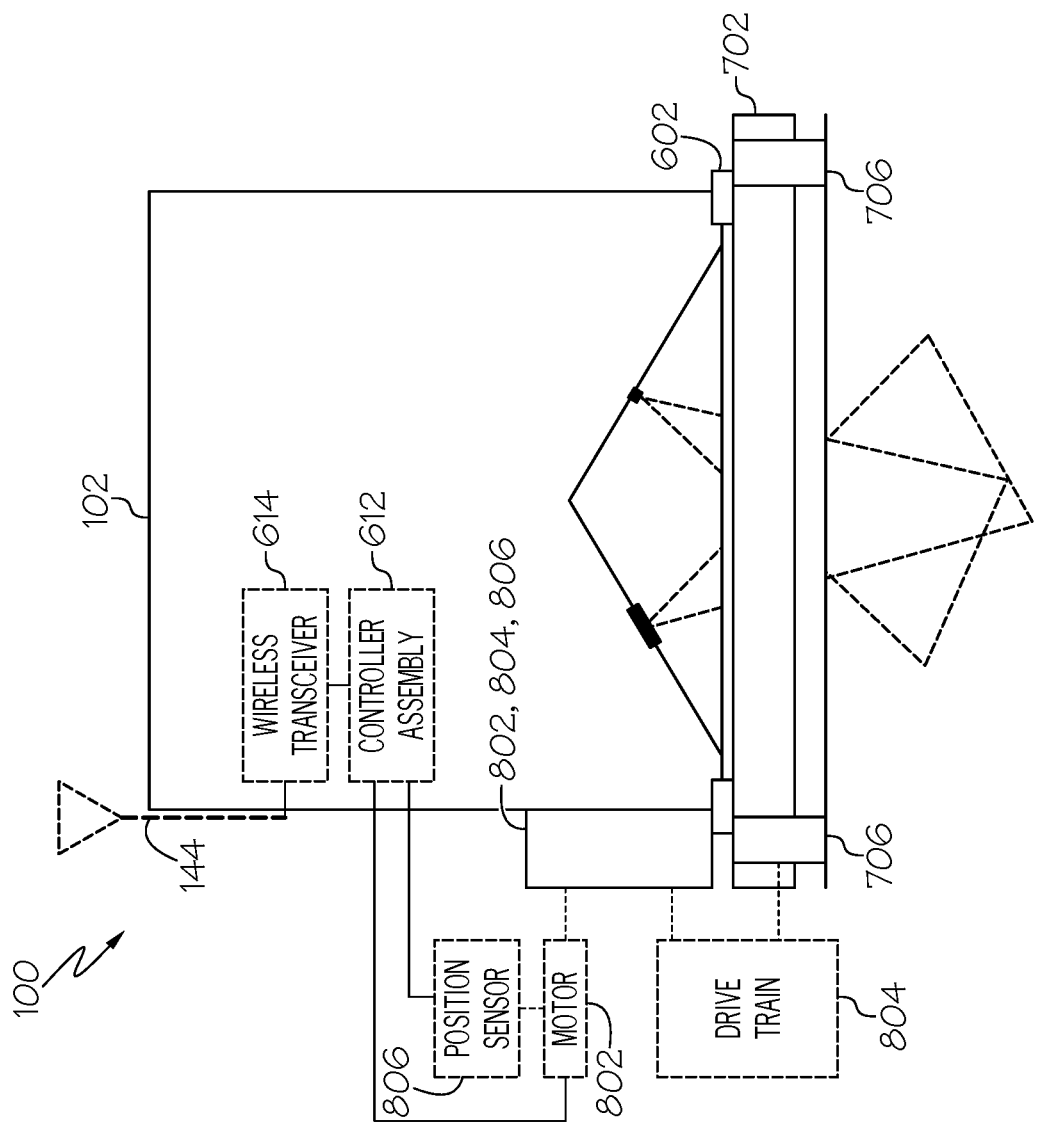
FIG. 8A
FIG. 8B

INTEGRATED BACKSCATTER X-RAY ASSEMBLIES FOR DETECTING BACKSCATTER X-RAYS REFLECTED BY TARGET AREA OF ARTICLE UNDER TEST AND ASSOCIATED METHODS

FIELD

The present disclosure relates generally to integrated backscatter X-ray assemblies and, particularly, to using integrated backscatter X-ray assemblies for detecting backscatter X-rays reflected by a target area of an article under test. A movable base to raise and lower the integrated backscatter X-ray assembly relative to the article under test is contemplated to capture Z-axis backscatter X-ray data. Similarly, a mobile platform to move the integrated backscatter X-ray assembly along a longitudinal axis of the article under test is contemplated to capture XY backscatter X-ray data. The three-dimensional backscatter X-ray data is available for reconstruction of three-dimensional models of the article under test.

BACKGROUND

There is a need for the detection and measurement of thickness of a gap or shim materials in composite structures for aircraft. Additionally, there is a need to detect corrosion, water intrusion, and disbands beneath the subsurface. The existing solution is to take apart the structure and manually measure the gap or shim thickness. This technique is extremely time-consuming and expensive to perform. Currently, backlogs to perform this inspection are causing delays in the delivery of aircraft and causing millions of dollars in rework and late penalties.

A current conventional X-ray backscattering system (e.g., RadalyX® by Radalytica a.s. of Olomouc, Czech Republic) requires two robots-one for the detector and one for the x-ray source. Each unit requires its cooling system and power supply. In addition, using a conventional X-ray source and a narrow-slit aperture results in a significant loss of around 90% of the generated X-rays. Moreover, the Radalytica system requires both units to maintain constant triangulation coordinates during the inspection because any change in the detector or X-ray source distance would lead to failure of three-dimensional imagery reconstruction. Additionally, the Radalytica system is bulky and impractical for infield inspection.

Accordingly, those skilled in the art continue with research and development efforts to improve techniques for streamlining inspection of articles under test.

SUMMARY

Disclosed are examples of integrated backscatter X-ray assemblies and methods for detecting backscatter X-rays reflected by a target area of an article under test. The following is a non-exhaustive list of examples, which may or may not be claimed, of the subject matter according to the present disclosure.

In an example, an integrated backscatter X-ray assembly for detecting backscatter X-rays reflected by a target area of an article under test is disclosed. The integrated backscatter X-ray assembly includes an enclosure, an X-ray power supply, an X-ray tube, a backscatter X-ray detector and a cooling fluid. The X-ray power supply disposed within the enclosure. The X-ray tube disposed within the enclosure and operatively coupled to the X-ray power supply. The backscatter X-ray detector is disposed within the enclosure. The cooling fluid disposed within the enclosure such that the X-ray power supply, the X-ray tube and the backscatter X-ray detector are immersed in the cooling fluid.

In an example, a method for detecting backscatter X-rays reflected by a target area of an article under test includes: (1) positioning an enclosure relative to the target area of the article under test, the enclosure housing an X-ray power supply, an X-ray tube operatively coupled to the X-ray power supply and a backscatter X-ray detector, the target area comprising a target length along a longitudinal axis and a target width transverse to the longitudinal axis, the enclosure comprising a side wall facing the article under test, the side wall comprising a first segment and a second segment that form an inverted angle facing the article under test, an emitter portion of the X-ray tube disposed proximate the first segment and an aperture portion of the backscatter X-ray detector disposed proximate the second segment; (2) adjusting a position of the enclosure such that the emitter portion of the X-ray tube and the aperture portion of the backscatter X-ray detector are disposed at a predetermined elevation above the article under test and a predetermined longitudinal position in relation to the target area for nondestructive inspection of a transverse portion of a surface layer of the target area; projecting an X-ray fan beam from the X-ray tube toward the transverse portion of the surface layer at the predetermined longitudinal position; (3) detecting backscatter X-rays reflected by the article under test at the backscatter X-ray detector in response to the projecting of the X-ray fan beam, the backscatter X-rays that were detected having passed through the aperture portion to a detector array of the backscatter X-ray detector; and (4) cooling the X-ray power supply, the X-ray tube and the backscatter X-ray detector during the projecting of the X-ray fan beam and the detecting of the backscatter X-rays using a cooling fluid disposed within the enclosure, the X-ray power supply, the X-ray tube and the backscatter X-ray detector being immersed in the cooling fluid.

In another example, an integrated backscatter X-ray assembly for detecting backscatter X-rays reflected by a target area of an article under test is disclosed. The integrated backscatter X-ray assembly includes an enclosure, an X-ray power supply, an X-ray tube, a backscatter X-ray detector, a cooling fluid, a movable base and a mobile platform. The X-ray power supply disposed within the enclosure. The X-ray tube disposed within the enclosure and operatively coupled to the X-ray power supply. The backscatter X-ray detector is disposed within the enclosure. The cooling fluid disposed within the enclosure such that the X-ray power supply, the X-ray tube and the backscatter X-ray detector are immersed in the cooling fluid. The movable base supporting the enclosure and configured to position the enclosure in relation to the target area of the article under test. The target area comprises a target length along a longitudinal axis and a target width transverse to the longitudinal axis. The movable base is configured to position an emitter portion of the X-ray tube and an aperture portion of the backscatter X-ray detector to a predetermined elevation above the article under test and a predetermined longitudinal position in relation to the target area for nondestructive inspection of a transverse portion of a surface layer of the target area. The mobile platform supporting the movable base and configured to change longitudinal positions of the enclosure along the longitudinal axis in relation to the article under test to position the emitter portion of the X-ray tube and the aperture portion of the backscatter X-ray detector to a second predetermined longitudinal position for nondestructive inspection of a second transverse portion of the surface layer of the target area.

Other examples of the disclosed integrated backscatter X-ray assemblies and methods for detecting backscatter X-rays reflected by a target area of an article under test will become apparent from the following detailed description, the accompanying drawings and the appended claims.

BRIEF DESCRIPTION OF THE DRAWINGS

FIG. 2A is a top view of an example of the target area of the article under test of FIG. 1 with an example of an X-ray fan beam projected from the integrated backscatter X-ray assembly of FIG. 1;

FIG. 2B is a side view showing the target area and the X-ray fan beam of FIG. 2A;

FIG. 5A is front view of the integrated backscatter X-ray assembly of FIG. 1 positioned at a predetermined elevation from the target area by an example of a movable base that shows projection of X-rays at the target area and detection of backscatter X-rays from a surface layer of the target area;

FIG. 5B is side view of the integrated backscatter X-ray assembly of FIG. 1 positioned at a predetermined longitudinal position in relation to a longitudinal axis of the target area;

FIG. 8A is a front view of the integrated backscatter X-ray assembly of FIG. 7 that provides a functional block diagram of an external controller assembly for position control of the integrated backscatter X-ray assembly using a drive motor, a drive train and a mobile platform to change longitudinal positions along a longitudinal axis of the target area and provides external communications paths from the external controller assembly;

FIG. 8B is a side view of the integrated backscatter X-ray assembly of FIG. 8A positioned at predetermined longitudinal position in relation to the longitudinal axis of the target area;

DETAILED DESCRIPTION

Figure 1:
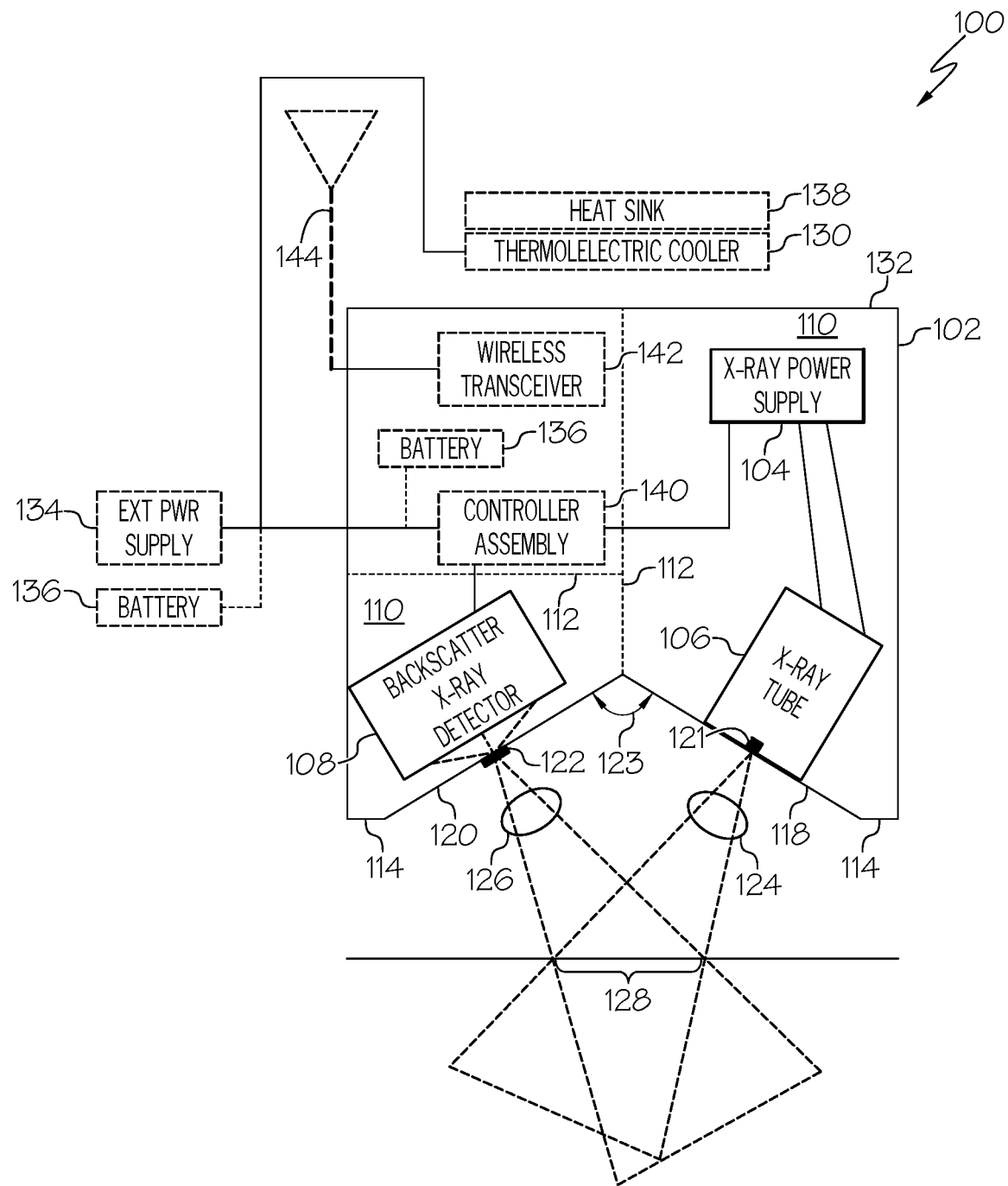
FIG. 1 is a functional block diagram of an example of an integrated backscatter X-ray assembly for detecting backscatter X-rays reflected by a target area of an article under test.

The various examples of integrated backscatter X-ray assemblies and methods for detecting backscatter X-rays reflected by a target area of an article under test provide assemblies in which the X-ray power supply, X-ray tube and backscatter X-ray detector are housed within a single enclosure. This allows for these components to be submerged in a mineral nonconductive oil or the like for cooling and eliminates the need for an external cooling system. The various examples of the integrated backscatter X-ray assemblies and methods also provide a solution for accurate detection of thickness of a gap or shim materials in composite structures for aircraft, corrosion, water intrusion, and disbands beneath the surface.

Additionally, the various examples of the integrated backscatter X-ray assemblies and methods also provide a high-speed integrated X-ray Back scattering system that provides X-ray backscatter data and corresponding position data for reconstruction of three-dimensional models of the target area of the article under test by a three-dimensional reconstruction system. This addresses the issues of conventional point rastering laser beam-type X-ray back scattering systems, which are extremely bulky, heavy, and incapable of generating three-dimensional imaging due to their large single detectors. For example, to achieve three-dimensional backscattering imaging, a two-dimensional image slice of the target area is created. To obtain a complete the three-dimensional backscatter image, multiple two-dimensional slices are integrated and stitched together.

The various examples of the integrated backscatter X-ray assemblies provide a compact and practical assembly. This assembly incorporates the X-ray power supply, X-ray tube and backscatter X-ray detector within a single inspection head unit. The components of the inspection head unit are submerged in a mineral nonconductive oil, eliminating the need for external cooling. The integrated backscatter X-ray assembly may also include movable base with a base member to support the inspection head unit, an elevation track and an actuator to change elevations in relation to the target area. The integrated backscatter X-ray assembly may also include a mobile platform for transport of the inspection head unit along an expandable track that can be attached to the aircraft structure. The movable base and the mobile platform enables the inspection head unit to scan in three axes, providing efficient and accurate inspections of a large target area.

Electronics for communication and control of the inspection head unit are housed inside the unit. Electronics for communication and control of the movable base and the mobile platform may be disposed on the exterior of the unit. The backscatter X-ray data and position data is transferred wirelessly to a backscatter X-ray data repository for access by a three-dimensional reconstruction computer system for image reconstruction and evaluation. The parameters and operation of the X-ray power supply, X-ray tube and backscatter X-ray detector are controlled remotely. Likewise, safety mechanisms are operated and controlled remotely.

Figure 3B:
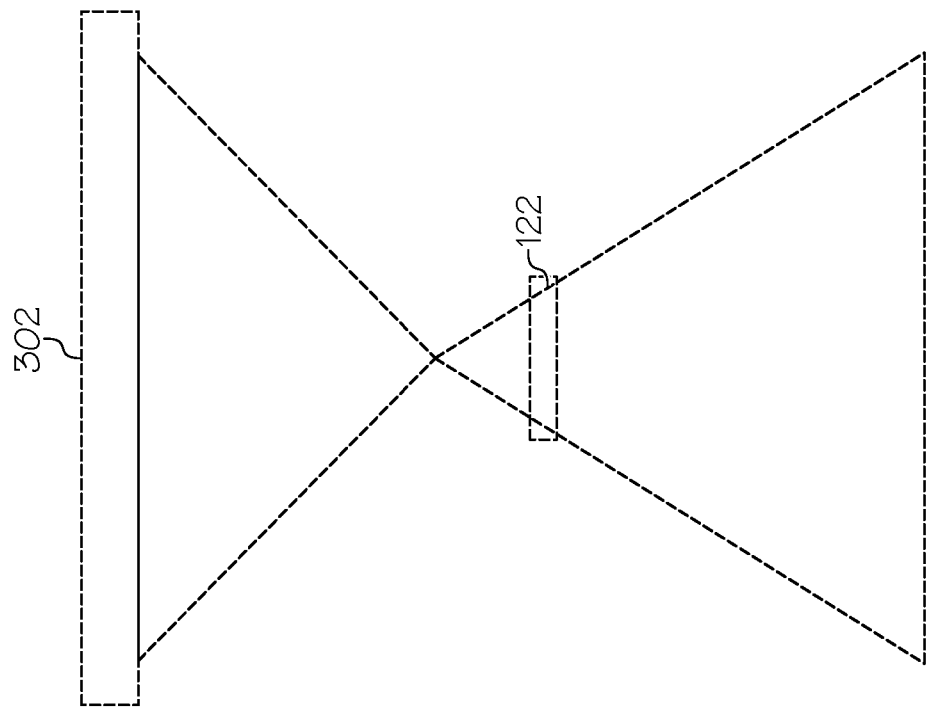
FIG. 3B is a top view of an example of an aperture portion in the backscatter X-ray detector of FIG. 3A and the detector array of FIG. 3A that functionally shows a field of view from the target area through the aperture portion to the detector array.
Figure 3A:
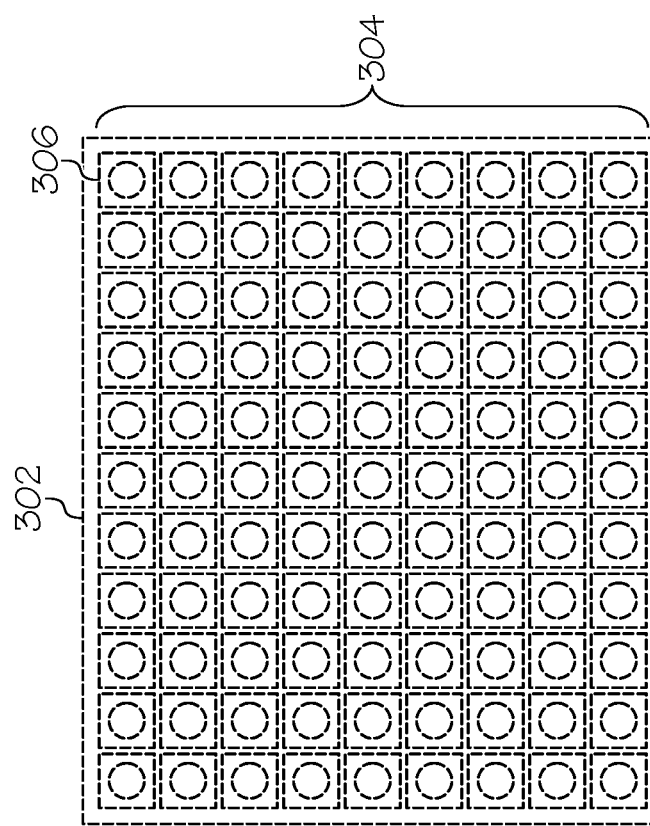
FIG. 3A is a front view of an example of a detector array in an example of a backscatter X-ray detector of the integrated backscatter X-ray assembly of FIG. 1.

Referring generally to FIGS. 1, 2A-B, 3A-B, 4, 5A-B, 6A-B, 7, 8A-B and 9, by way of examples, the present disclosure is directed to an integrated backscatter X-ray assembly 100 for detecting backscatter X-rays reflected by a target area 128 of an article under test 116. FIG. 1 is a function block diagram of an example of the integrated backscatter X-ray assembly 100. FIGS. 2A and 2B provide top and side views of an example of the target area 128 with an example of an X-ray fan beam 124 projected from integrated backscatter X-ray assembly 100 of FIG. 1. FIGS. 3A and 3B provide front and top views of an example of a detector array 302 and an example of an aperture portion 122 in an example of a backscatter X-ray detector 108 of the integrated backscatter X-ray assembly 100 of FIG. 1 with a field of view from the target area 128 through the aperture portion 122 to the detector array 302.

Figure 4:
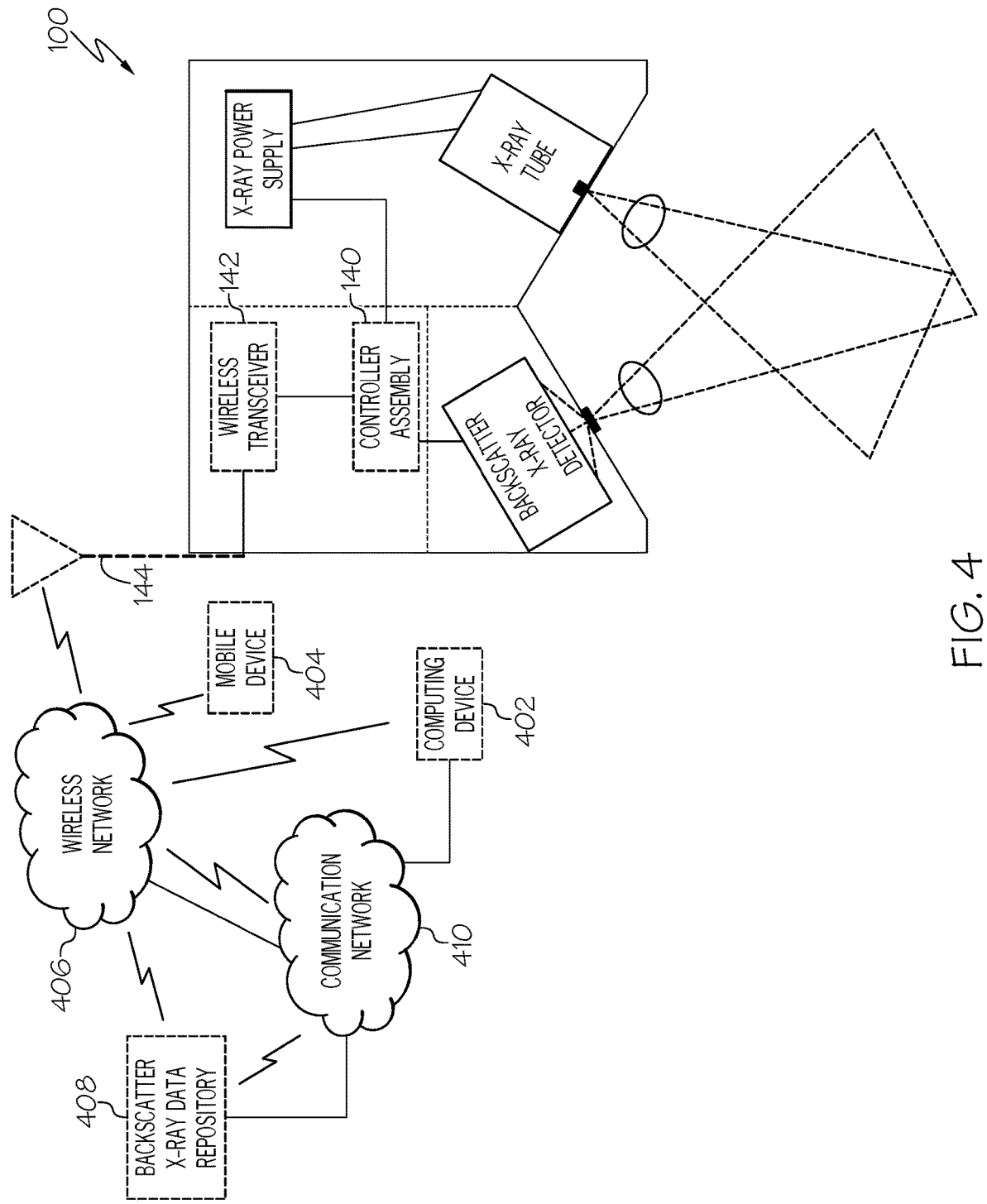
FIG. 4 is a functional block diagram of the integrated backscatter X-ray assembly of FIG. 1 that shows an example of an internal controller assembly for the integrated backscatter X-ray assembly and provides external communications paths from the internal controller assembly to an example of a computing device and an example of a backscatter X-ray data repository.
Figure 6B:
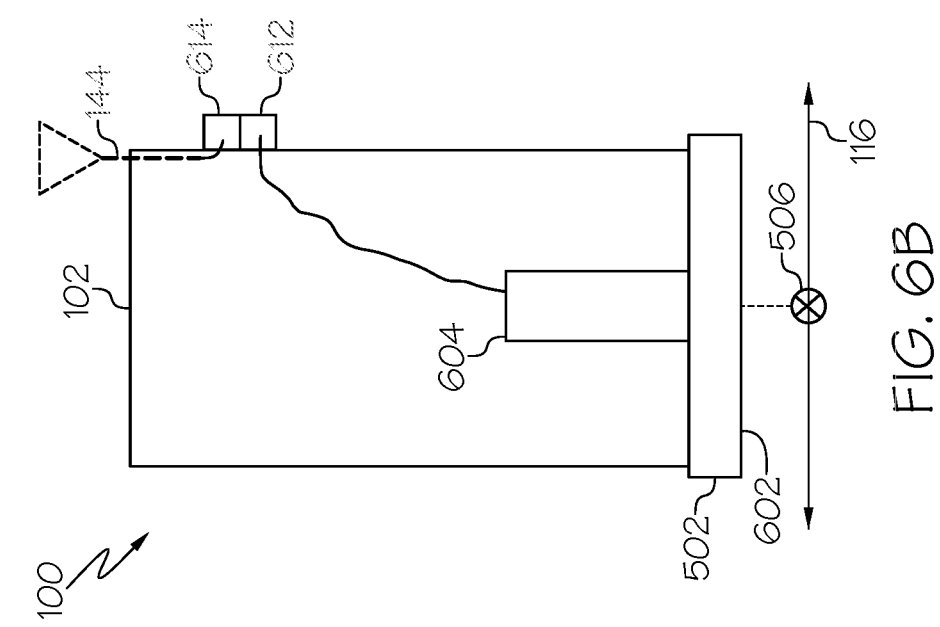
FIG. 6B is a side view of the integrated backscatter X-ray assembly of FIG. 6A positioned at a predetermined longitudinal position in relation to the longitudinal axis of the target area.
Figure 6A:
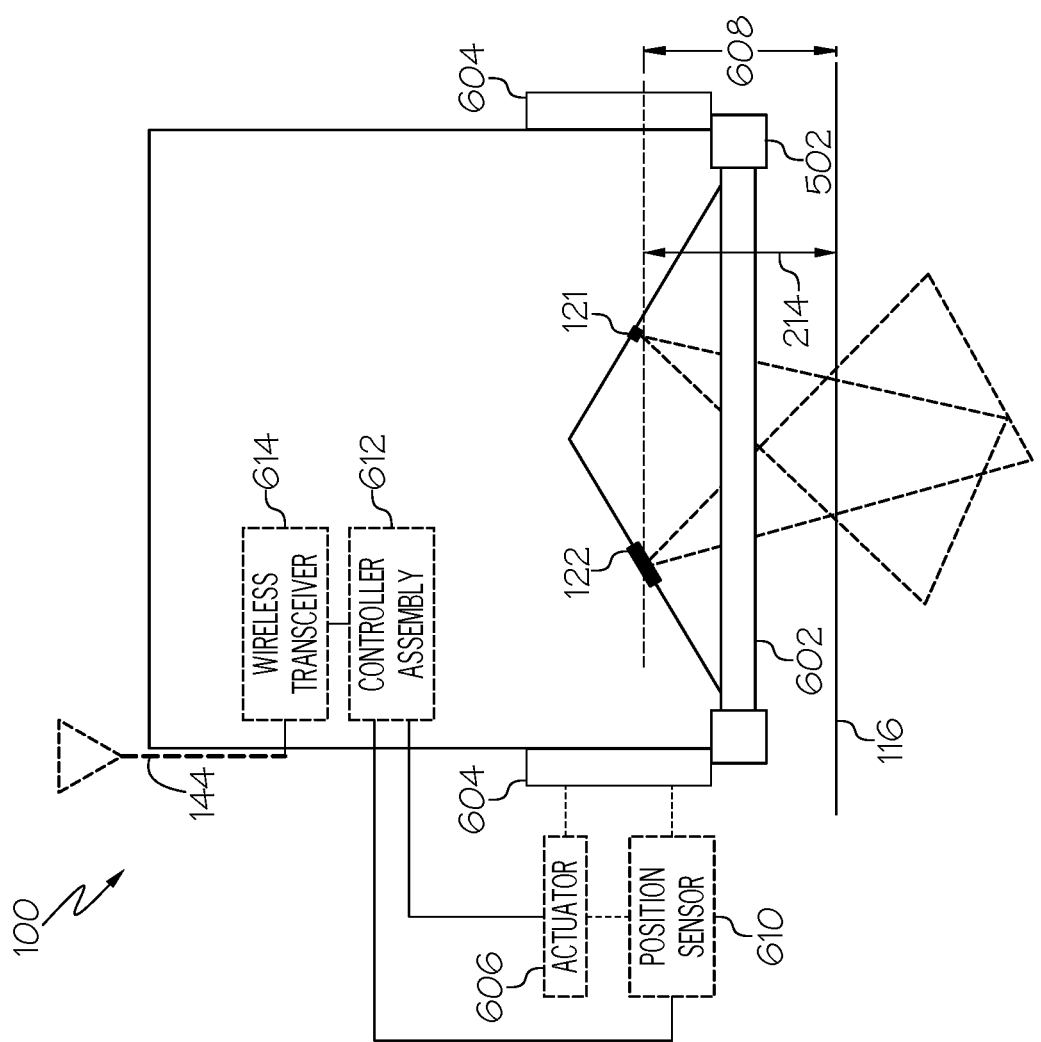
FIG. 6A is a front view of another example of the integrated backscatter X-ray assembly of FIG. 1 that provides a functional block diagram of an example of an external controller assembly for elevation position control of the integrated backscatter X-ray assembly using a base member, an elevation track and an actuator and provides external communications paths from the external controller assembly.

FIG. 4 is a functional block diagram of the integrated backscatter X-ray assembly 100 of FIG. 1 that shows an example of an internal controller assembly 140 and provides external communication paths from the internal controller assembly 140 to a an example of a computing device 402 and an example of a backscatter X-ray data repository 408. FIG. 5A provides a front view of the integrated backscatter X-ray assembly 100 of FIG. 1 positioned at a predetermined elevation from the target area 128 by an example of a movable base 502. FIG. 5B provides a side view of the integrated backscatter X-ray assembly 100 of FIG. 1 at a predetermined longitudinal position in relation to a longitudinal axis 204 of the target area 128. FIG. 6A provides a front view of another example of the integrated backscatter X-ray assembly 100 of FIG. 1 that provides a functional block diagram of an example of an external controller assembly 612 for elevation position control of the integrated backscatter X-ray assembly 100 using a base member 602, an elevation track 604 and an actuator 606 and provides external communication paths for the external controller assembly 612. FIG. 6B provides a side view of the integrated backscatter X-ray assembly 100 of FIG. 6A positioned at a predetermined longitudinal position in relation to a longitudinal axis 204 of the target area 128.

Figure 7:
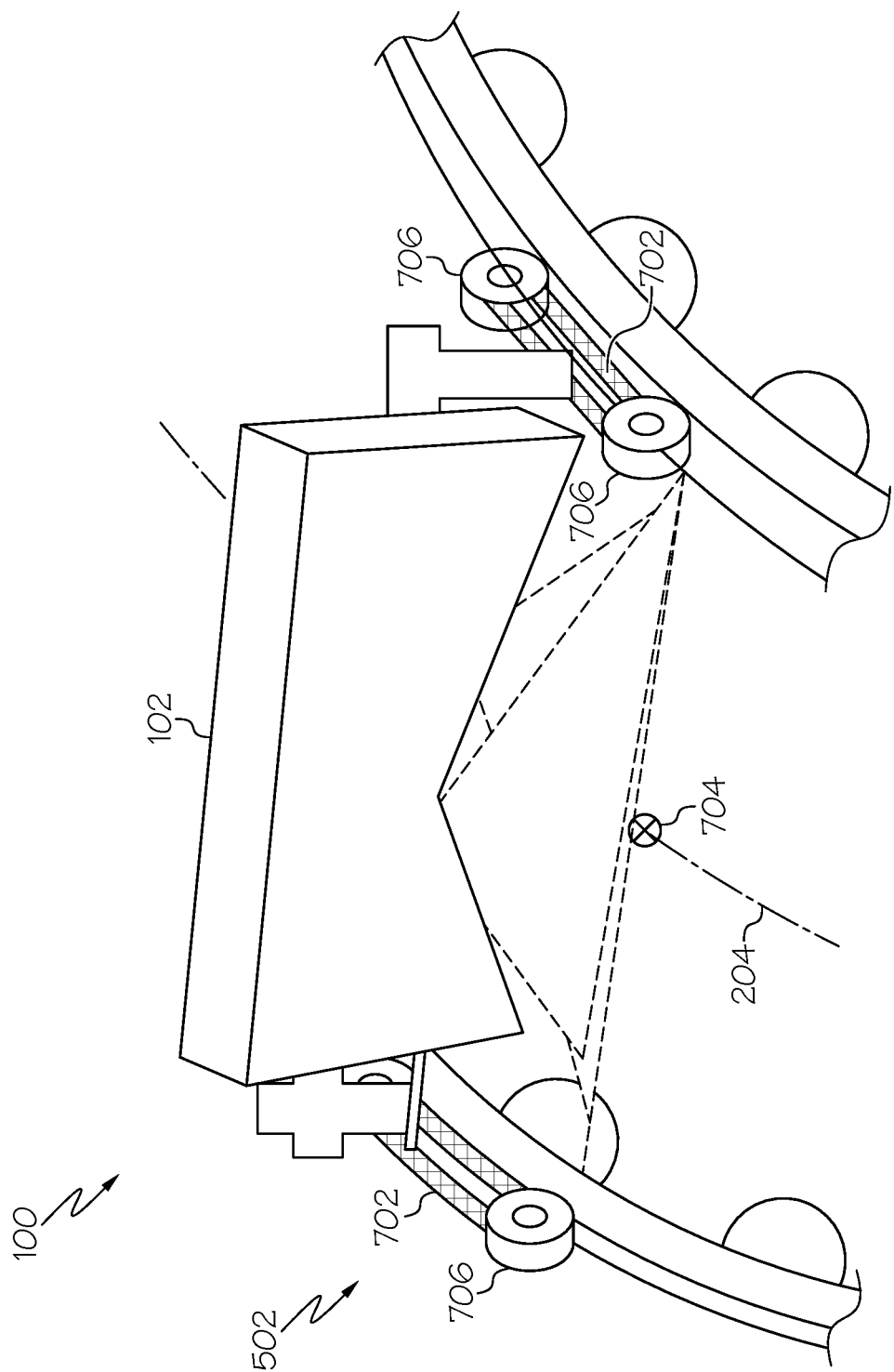
FIG. 7 is a functional diagram of yet another example of the integrated backscatter X-ray assembly of FIG. 1 supported by an example of a mobile platform for translation of a track system along a longitudinal axis of the target area of the article under test.
Figure 9:
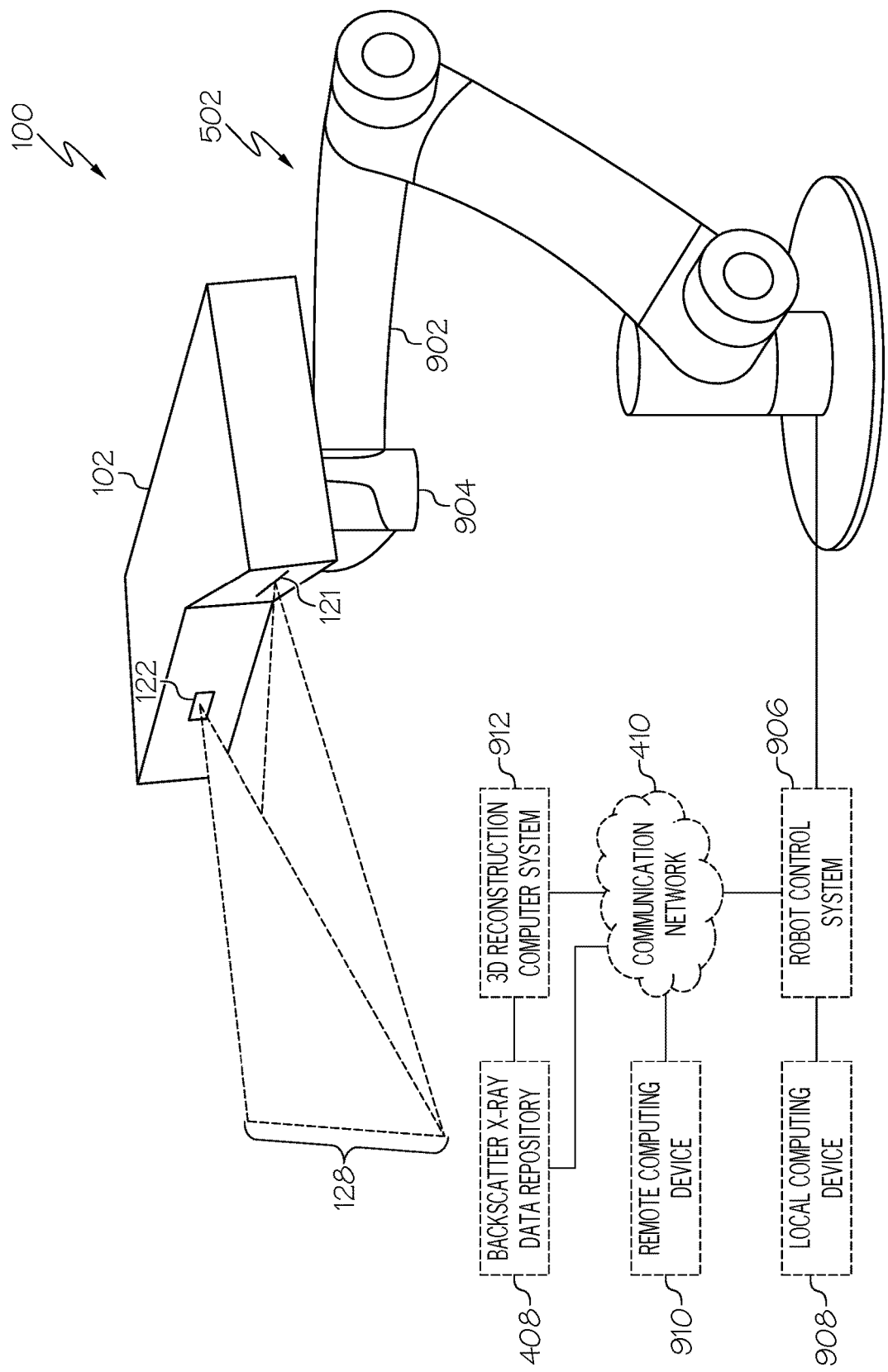
FIG. 9 is a functional block diagram of still another example of the integrated backscatter X-ray assembly of FIG. 1 in which another example of the movable base includes an example of a robotic arm and an example of a robot control system showing external communications paths from robot control system to a local computing device, a remote computing device and a backscatter X-ray data repository.

FIG. 7 is a functional block diagram of yet another example of the integrated backscatter X-ray assembly 100 of FIG. 1 supported by an example of a mobile platform 702 for translation of a track system along a longitudinal axis 204 of the target area 128 of the article under test 116. FIG. 8A provides a front view of the integrated backscatter X-ray assembly 100 of FIG. 7 that provides a functional block diagram of an example of an external controller assembly 612 for position control of the integrated backscatter X-ray assembly 100 using a drive motor 802, a drive train 804 and a mobile platform 702 and provides external communication paths from the external controller assembly 612. FIG. 8B provides a side view of the integrated backscatter X-ray assembly 100 of FIG. 7 positioned at a predetermined longitudinal position in relation to a longitudinal axis 204 of the target area 128. FIG. 9 is a functional block diagram of still another example of the integrated backscatter X-ray assembly 100 of FIG. 1 in which another example of the movable base 502 includes an example of a robotic arm 902 and an example of a robot control system 906 showing external communication paths from the robot control system 906 to a local computing device 908, a remote computing device 910 and the backscatter X-ray data repository 408.

With reference again to 1, 2A-B, 3A-B, 4, 5A-B, 6A-B, 7, 8A-B and 9, in one or more examples, an integrated backscatter X-ray assembly 100 for detecting backscatter X-rays reflected by a target area 128 of an article under test 116 includes an enclosure 102, an X-ray power supply 104, a backscatter X-ray detector 108 and a cooling fluid 110. The X-ray power supply 104 disposed within the enclosure 102. The X-ray tube 106 disposed within the enclosure 102 and operatively coupled to the X-ray power supply 104. The backscatter X-ray detector 108 disposed within the enclosure 102. The cooling fluid 110 disposed within the enclosure 102 such that the X-ray power supply 104, the X-ray tube 106 and the backscatter X-ray detector 108 are immersed in the cooling fluid 110.

In another example of the integrated backscatter X-ray assembly 100, the enclosure 102 includes a Faraday cage 112 to protect the backscatter X-ray detector 108 from electromagnetic fields emitted by the X-ray power supply 104 and the X-ray tube 106.

In yet another example of the integrated backscatter X-ray assembly 100, the enclosure 102 includes a side wall 114 configured to face the article under test 116. The side wall 114 includes a first segment 118 and a second segment 120 that form an inverted angle 123 configured to face the article under test 116. An emitter portion 121 of the X-ray tube 106 disposed proximate the first segment 118 and an aperture portion 122 of the backscatter X-ray detector 108 disposed proximate the second segment 120. In a further example, the inverted angle 123 includes an angle ranging from approximately 50 degrees to approximately 150 degrees, approximately 60 degrees to approximately 120 degrees, approximately 70 degrees to approximately 100 degrees, approximately 80 degrees to approximately 90 degrees or any other suitable angular range.

In still another example of the integrated backscatter X-ray assembly 100, the X-ray tube 106 and the backscatter X-ray detector 108 are oriented within the enclosure 102 such that an X-ray fan beam 124 generated by the X-ray power supply 104 and the X-ray tube 106 and a field of view 126 for the backscatter X-ray detector 108 intersect at the target area 128 of the article under test 116. In a further example, the X-ray tube 106 is oriented at an angle relative to the target area 128 of the article under test 116 ranging from approximately 15 degrees to approximately 65 degrees, approximately 30 degrees to approximately 60 degrees, approximately 40 degrees to approximately 55 degrees, approximately 45 degrees to approximately 50 degrees or any other suitable angular range. In another further example, the backscatter X-ray detector 108 is oriented at an angle relative to the target area 128 of the article under test 116 ranging from approximately-15 degrees to approximately-65 degrees, approximately-30 degrees to approximately-60 degrees, approximately-40 degrees to approximately-55 degrees, approximately-45 degrees to approximately-50 degrees or any other suitable angular range.

In still yet another example of the integrated backscatter X-ray assembly 100, the X-ray power supply 104 and the X-ray tube 106 are configured to generate an X-ray fan beam 124 for nondestructive inspection of the article under test 116. In a further example, the X-ray tube 106 is configured to project the X-ray fan beam 124 at the target area 128 of the article under test 116. In an even further example, the target area 128 includes a target length 202 along a longitudinal axis 204 and a target width 206 transverse to the longitudinal axis 204.

In an even yet further example, the X-ray fan beam 124 includes a beam length 208 that represents a fraction of the target length 202, a beam width 210 that relates to the target width 206 and a beam depth 212 representative of a depth at which backscatter X-rays reflected by the article under test 116 in response to the X-ray fan beam 124 is detectable by the backscatter X-ray detector 108. In a further example, the beam length 208 is representative of rows of pixels in the target area 128, the rows of pixels ranging from 4 rows to 10 rows. In another further example, the beam width 210 is representative of columns of pixels in the target area 128. The columns of pixels ranging from 200 columns to 600 columns. In another even yet further example, the beam depth 212 is representative of a depth within the target area 128 along a Z axis 214 extending from the article under test 116 toward the enclosure 102. The beam depth 212 ranging from 4 millimeters to 10 millimeters.

In another example of the integrated backscatter X-ray assembly 100, the backscatter X-ray detector 108 is configured to detect at least a portion of backscatter X-rays reflected from the target area 128 of the article under test 116 in response to an X-ray fan beam 124 generated by the X-ray power supply 104 and the X-ray tube 106.

In yet another example of the integrated backscatter X-ray assembly 100, the backscatter X-ray detector 108 includes an aperture portion 122 and a detector array 302. The aperture portion 122 configured to pass through at least a portion of backscatter X-rays reflected from the target area 128 of the article under test 116 in response to an X-ray fan beam 124 generated by the X-ray power supply 104 and the X-ray tube 106. The detector array 302 is configured to detect the portion of the backscatter that passed through the aperture portion 122. In a further example, the aperture portion 122 and the detector array 302 are oriented and spaced to receive the portion of the backscatter X-rays reflected from the target area 128 of the article under test 116 in response to the X-ray fan beam 124 generated by the X-ray power supply 104 and the X-ray tube 106.

In an even further example, the detector array 302 includes a plurality of direct detectors 304 arranged in multiple rows and multiple columns. In a further example, the direct detectors 304 include photon counting detectors 306, hybrid pixel detectors, monolithic active pixel sensors, pn-type charge coupled devices or any other suitable type of direct detector in any suitable combination. In another further example, the multiple rows of the direct detectors 304 range from approximately 200 rows to approximately 600 rows, approximately 300 rows to approximately 500 rows, approximately 350 rows to approximately 450 rows or any other suitable range of rows. In yet another further example, the multiple columns of the direct detectors 304 range from approximately 200 columns to approximately 600 columns, approximately 300 columns to approximately 500 columns, approximately 350 columns to approximately 450 columns or any other suitable range of columns.

In still another example of the integrated backscatter X-ray assembly 100, the cooling fluid 110 does not conduct electricity. In a further example, the cooling fluid 110 includes a nonconductive cooling fluid, an organic cooling fluid, a mineral oil or any other suitable cooling fluid in any suitable combination.

In still yet another example, the integrated backscatter X-ray assembly 100 also includes a thermoelectric cooler 130 secured to an exterior surface 132 of the enclosure 102 and configured to transfer thermal energy from the cooling fluid 110 by dissipating heat outside the enclosure 102 in response to receiving electrical power from at least one of an external power source 134 and a battery 136. In a further example, the integrated backscatter X-ray assembly also includes a heat sink 138 secured to the thermoelectric cooler 130 and configured to dissipate heat from the thermoelectric cooler 130 to an ambient testing environment.

In another example, the integrated backscatter X-ray assembly 100 also includes an internal controller assembly 140, an internal wireless transceiver 142 and an antenna 144. The internal controller assembly 140 disposed within the enclosure 102 and in operative communication with the X-ray power supply 104, the X-ray tube 106 and the backscatter X-ray detector 108 in response to receiving electrical power from at least one of an external power source 134 and a battery 136. The internal wireless transceiver 142 disposed within the enclosure 102 and in operative communication with the internal controller assembly 140. The antenna 144 secured to an exterior surface 132 of the enclosure 102 and in operative communication with the internal wireless transceiver 142. In a further example, the internal controller assembly 140, the internal wireless transceiver 142 and the antenna 144 are configured to receive control signals from a computing device 402, a mobile device 404 via a wireless network 406 or any other suitable control device in any suitable combination. In an even further example, the wireless network 406 includes a wireless fidelity network, a wireless local area network, a wireless personal area network, a metropolitan area network, a cellular network or any other suitable wireless network in any suitable combination. In another further example, the internal controller assembly 140, the internal wireless transceiver 142 and the antenna 144 are configured to transmit backscatter X-ray data to a backscatter X-ray data repository 408 accessible via a wireless network 406 and a communication network 410.

In yet another example of the integrated backscatter X-ray assembly 100, the target area 128 includes a target length 202 along a longitudinal axis 204 and a target width 206 transverse to the longitudinal axis 204. In this example, the integrated backscatter X-ray assembly 100 also includes a movable base 502 supporting the enclosure 102 and configured to position the enclosure 102 in relation to the target area 128 of the article under test 116. The X-ray tube 106 and the backscatter X-ray detector 108 are oriented within the enclosure 102 such that an X-ray fan beam 124 generated by the X-ray power supply 104 and the X-ray tube 106 and a field of view 126 for the backscatter X-ray detector 108 intersect at the target area 128 of the article under test 116. The movable base 502 is configured to position an emitter portion 121 of the X-ray tube 106 and an aperture portion 122 of the backscatter X-ray detector 108 to a predetermined elevation 504 above the article under test 116 and a predetermined longitudinal position 506 in relation to the target area 128 for nondestructive inspection of a transverse portion of a surface layer of the target area 128.

In a further example of the integrated backscatter X-ray assembly 100, the movable base 502 includes a base member 602, an elevation track 604, an actuator 606, a position sensor 610, an external controller assembly 612, an external wireless transceiver 614 and an antenna 144. The base member 602 supporting the enclosure 102. The elevation track 604 movably coupled to the base member 602 and defining a Z axis 214 extending from the movable base 502 toward the article under test 116. The actuator 606 is attached to the elevation track 604 and the base member 602. The actuator 606 configured to change elevations of the enclosure 102 in relation to the article under test 116 to move the emitter portion 121 of the X-ray tube 106 and the aperture portion 122 of the backscatter X-ray detector 108 along the Z axis 214 to a second predetermined elevation 608 closer to the article under test 116 for nondestructive inspection of a subsurface layer of the target area 128. The position sensor 610 configured to detect movement of at least one of the actuator 606, the movable base 502 and the enclosure 102. The external controller assembly 612 is in operative communication with the actuator 606 and the position sensor 610 to control movement of the enclosure 102 along the Z axis 214. The external wireless transceiver 614 is in operative communication with the external controller assembly 612. The antenna 144 secured to the enclosure 102 and in operative communication with the external wireless transceiver 614.

In an even further example, the predetermined elevation 504 and the second predetermined elevation 608 are determined such that the surface layer of the target area 128 and the subsurface layer at least partially overlap. In an even yet further example, the overlap is representative of pixels in the target area 128 along the Z axis 214 in relation to the article under test 116. The pixels along the Z axis 214 ranging from 2 pixels to 5 pixels. In another even further example, the actuator 606 is configured to move the enclosure 102 closer to the article under test 116 to position the emitter portion 121 of the X-ray tube 106 and the aperture portion 122 of the backscatter X-ray detector 108 to additional predetermined elevations relating to nondestructive inspection of additional subsurface layers of the target area 128. In yet another even further example, the actuator 606 includes a linear actuator, a mechanical linear actuator, an electromechanical linear actuator, a piezoelectric linear actuator, a worm gear linear actuator, a screw-driven linear actuator or any other suitable actuator.

In still another even further example, the external controller assembly 612, the external wireless transceiver 614 and the antenna 144 are configured to receive control signals for control of the actuator 606 from a computing device 402, a mobile device 404 via a wireless network 406, an internal controller assembly 140 or any other suitable control device in any suitable combination. In an even yet further example, the wireless network 406 includes a wireless fidelity network, a wireless local area network, a wireless personal area network, a metropolitan area network, a cellular network or any other suitable wireless network in any suitable combination. In still yet another even further example, the external controller assembly 612, the external wireless transceiver 614 and the antenna 144 are configured to transmit position data from the position sensor 610 to a backscatter X-ray data repository 408 in conjunction with control of the actuator 606. The backscatter X-ray data repository 408 accessible via a wireless network 406 and a communication network 410.

In another further example of the integrated backscatter X-ray assembly 100, the movable base 502 includes a mobile platform 702 configured to change longitudinal positions of the enclosure 102 along the longitudinal axis 204 in relation to the article under test 116 to position the emitter portion 121 of the X-ray tube 106 and the aperture portion 122 of the backscatter X-ray detector 108 to a second predetermined longitudinal position 704 for nondestructive inspection of a second transverse portion of the surface layer of the target area 128. In an even further example, the predetermined longitudinal position 506 and the second predetermined longitudinal position 704 are determined such that the transverse portion of the surface layer of the target area 128 and the second transverse portion of the surface layer at least partially overlap. In an even yet further example, the overlap is representative of rows of pixels in the target area 128 along the longitudinal axis 204 in relation to the article under test 116. The rows of pixels ranging from 2 rows to 5 rows. In another even further example, the mobile platform 702 is configured to move the enclosure 102 along the longitudinal axis 204 of the target area 128 of the article under test 116 to position the emitter portion 121 of the X-ray tube 106 and the aperture portion 122 of the backscatter X-ray detector 108 to additional predetermined longitudinal positions relating to nondestructive inspection of additional transvers portions of the surface layer of the target area 128.

In yet another even further example of the integrated backscatter X-ray assembly 100, the mobile platform 702 includes a base member 602, a plurality of wheels 706, a drive motor 802, a drive train 804, a position sensor 806, an external controller assembly 612, an external wireless transceiver 614 and an antenna 144. The base member 602 supporting the enclosure 102. The plurality of wheels 706 rotatably attached to the base member 602. The drive motor 802 configured to selectively power movement of the mobile platform 702. The drive train 804 coupling the drive motor 802 to one or more wheel 706 of the plurality of wheels 706 for movement of the mobile platform 702 in response to operation of the drive motor 802. The position sensor 806 is configured to detect movement of at least one of the drive motor 802, the drive train 804 and the one or more wheel 706. The external controller assembly 612 is in operative communication with the drive motor 802 and the position sensor 806 to control movement of the mobile platform 702 along the longitudinal axis 204. The external wireless transceiver 614 is in operative communication with the external controller assembly 612. The antenna 144 secured to the enclosure 102 and in operative communication with the external wireless transceiver 614.

In an even yet further example, the drive motor 802 includes a DC motor, a precision motor, a stepper motor, a servo motor, a rotary actuator or any other suitable drive motor. In another even yet further example, the drive train 804 includes a gear box assembly, a belt drive assembly, a chain drive assembly, a gear coupled to the drive motor 802, a pulley coupled to the drive motor 802, a sprocket coupled to the drive motor 802, a gear driven axle, a pulley driven axle, a sprocket driven axel or any other suitable drive train in any suitable combination. In yet another even yet further example, the position sensor 806 includes a rotary position sensor, a rotary encoder, a rotary precision potentiometer or any other suitable position sensor.

In still another even yet further example, the external controller assembly 612, the external wireless transceiver 614 and the antenna 144 are configured to receive control signals for control of the drive motor 802 from a computing device 402, a mobile device 404 via a wireless network 406, an internal controller assembly 140 or any other suitable control device in any suitable combination. In a further example, the wireless network 406 includes a wireless fidelity network, a wireless local area network, a wireless personal area network, a metropolitan area network, a cellular network or any other suitable wireless network in any suitable combination. In still yet another even yet further example, the external controller assembly 612, the external wireless transceiver 614 and the antenna 144 are configured to transmit position data from the position sensor 806 to a backscatter X-ray data repository 408 accessible via a wireless network 406 and a communication network 410. The position data relating to control of the drive motor 802.

In yet another further example of the integrated backscatter X-ray assembly 100, the movable base 502 includes a robotic arm 902 with an end effector 904 and a robot control system 906. The robotic arm 902 supporting the enclosure 102. The robot control system 906 in operative communication with the robotic arm 902. The robot control system 906 and the robotic arm 902 are configured to change elevations of the enclosure 102 in relation to the article under test 116 to move the emitter portion 121 of the X-ray tube 106 and the aperture portion 122 of the backscatter X-ray detector 108 along a Z axis 214 to a second predetermined elevation 608 closer to the article under test 116 for nondestructive inspection of a subsurface layer of the target area 128. The robot control system 906 and the robotic arm 902 are configured to change longitudinal positions of the enclosure 102 along the longitudinal axis 204 in relation to the article under test 116 to position the emitter portion 121 of the X-ray tube 106 and the aperture portion 122 of the backscatter X-ray detector 108 to a second predetermined longitudinal position 704 for nondestructive inspection of a second transverse portion of the surface layer of the target area 128.

In an even further example, the predetermined elevation 504 and the second predetermined elevation 608 are determined such that the surface layer of the target area 128 and the subsurface layer at least partially overlap. In an even yet further example, the overlap is representative of pixels in the target area 128 along the Z axis 214 in relation to the article under test 116, the pixels along the Z axis 214 ranging from 2 pixels to 5 pixels. In another even further example, the robot control system 906 and the robotic arm 902 are configured to move the enclosure 102 closer to the article under test 116 to position the emitter portion 121 of the X-ray tube 106 and the aperture portion 122 of the backscatter X-ray detector 108 to additional predetermined elevations relating to nondestructive inspection of additional subsurface layers of the target area 128.

In yet another even further example, the robot control system 906 is configured to receive control signals for control of the robotic arm 902 from a local computing device 908, a remote computing device 910 or any other suitable control device in any suitable combination. In still another even further example, the robot control system 906 is configured to transmit position data relating to the predetermined elevation 504 and the predetermined longitudinal position 506 of the enclosure 102 to a backscatter X-ray data repository 408 in conjunction with control of the robotic arm 902.

In still yet another even further example, the predetermined longitudinal position 506 and the second predetermined longitudinal position 704 are determined such that the transverse portion of the surface layer of the target area 128 and the second transverse portion of the surface layer at least partially overlap. In a further example, the overlap is representative of rows of pixels in the target area 128 along the longitudinal axis 204 in relation to the article under test 116. The rows of pixels ranging from 2 rows to 5 rows.

In another even further example, the robot control system 906 is configured to move the enclosure 102 along the longitudinal axis 204 of the target area 128 of the article under test 116 to position the emitter portion 121 of the X-ray tube 106 and the aperture portion 122 of the backscatter X-ray detector 108 to additional predetermined longitudinal positions relating to nondestructive inspection of additional transvers portions of the surface layer of the target area 128.

Referring generally to FIGS. 1, 2A-B, 3A-B, 4, 5A-B, 6A-B, 7, 8A-B and 9-18, by way of examples, the present disclosure is directed to a method 1000, 1200, 1300, 1400, 1500, 1600, 1700, 1800 for detecting backscatter X-rays reflected by a target area 128 of an article under test 116. FIG. 1 is a function block diagram of an example of the integrated backscatter X-ray assembly 100. FIGS. 2A and 2B provide top and side views of an example of the target area 128 with an example of an X-ray fan beam 124 projected from integrated backscatter X-ray assembly 100 of FIG. 1. FIGS. 3A and 3B provide front and top views of an example of a detector array 302 and an example of an aperture portion 122 in an example of a backscatter X-ray detector 108 of the integrated backscatter X-ray assembly 100 of FIG. 1 with a field of view from the target area 128 through the aperture portion 122 to the detector array 302.

FIG. 4 is a functional block diagram of the integrated backscatter X-ray assembly 100 of FIG. 1 that shows an example of an internal controller assembly 140 and provides external communication paths from the internal controller assembly 140 to a an example of a computing device 402 and an example of a backscatter X-ray data repository 408. FIG. 5A provides a front view of the integrated backscatter X-ray assembly 100 of FIG. 1 positioned at a predetermined elevation from the target area 128 by an example of a movable base 502. FIG. 5B provides a side view of the integrated backscatter X-ray assembly 100 of FIG. 1 at a predetermined longitudinal position in relation to a longitudinal axis 204 of the target area 128. FIG. 6A provides a front view of another example of the integrated backscatter X-ray assembly 100 of FIG. 1 that provides a functional block diagram of an example of an external controller assembly 612 for elevation position control of the integrated backscatter X-ray assembly 100 using a base member 602, an elevation track 604 and an actuator 606 and provides external communication paths for the external controller assembly 612. FIG. 6B provides a side view of the integrated backscatter X-ray assembly 100 of FIG. 6A positioned at a predetermined longitudinal position in relation to a longitudinal axis 204 of the target area 128.

FIG. 7 is a functional block diagram of yet another example of the integrated backscatter X-ray assembly 100 of FIG. 1 supported by an example of a mobile platform 702 for translation of a track system along a longitudinal axis 204 of the target area 128 of the article under test 116. FIG. 8A provides a front view of the integrated backscatter X-ray assembly 100 of FIG. 7 that provides a functional block diagram of an example of an external controller assembly 612 for position control of the integrated backscatter X-ray assembly 100 using a drive motor 802, a drive train 804 and a mobile platform 702 and provides external communication paths from the external controller assembly 612. FIG. 8B provides a side view of the integrated backscatter X-ray assembly 100 of FIG. 7 positioned at a predetermined longitudinal position in relation to a longitudinal axis 204 of the target area 128. FIG. 9 is a functional block diagram of still another example of the integrated backscatter X-ray assembly 100 of FIG. 1 in which another example of the movable base 502 includes an example of a robotic arm 902 and an example of a robot control system 906 showing external communication paths from the robot control system 906 to a local computing device 908, a remote computing device 910 and the backscatter X-ray data repository 408.

Figure 10:
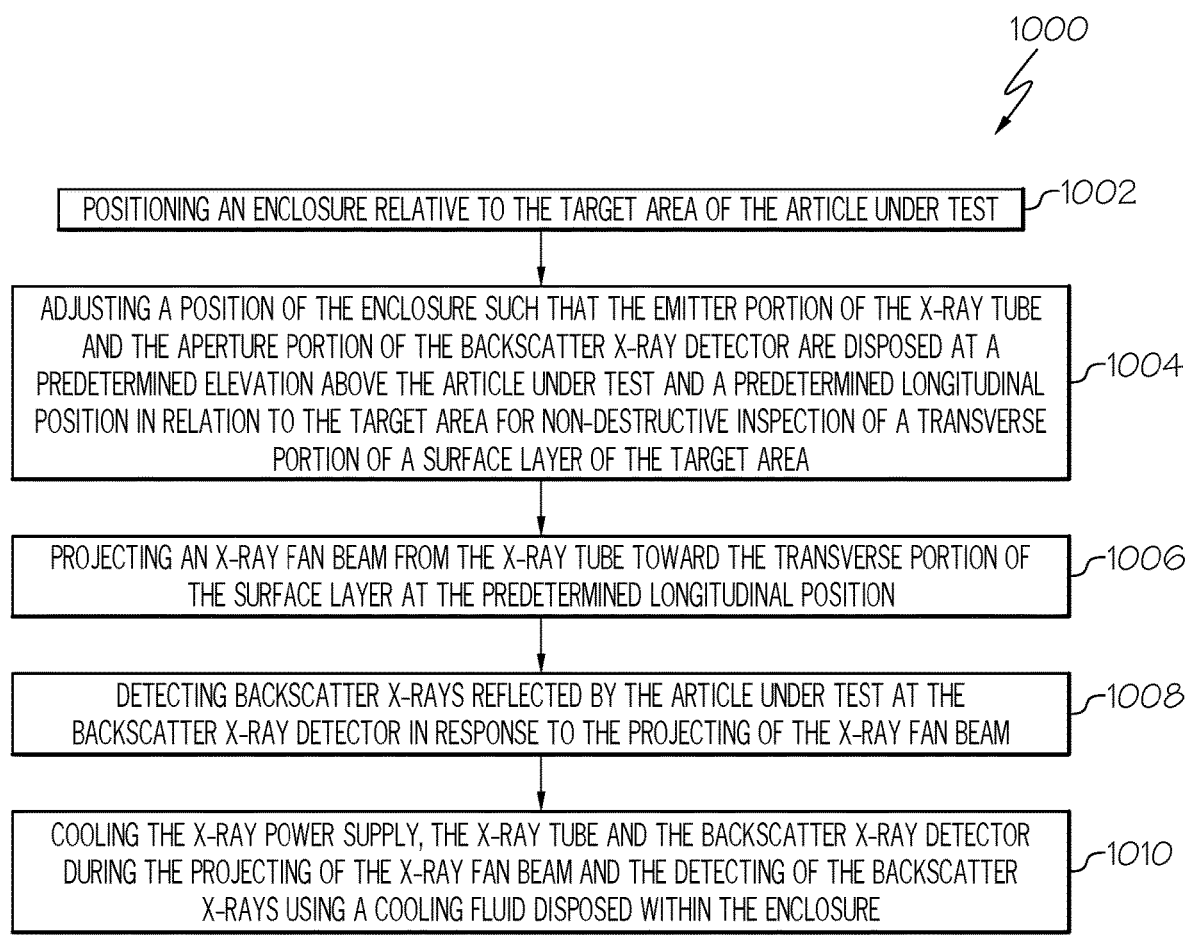
FIG. 10 is a flow diagram of an example of a method for detecting backscatter X-rays reflected by a target area of an article under test.
Figure 11:
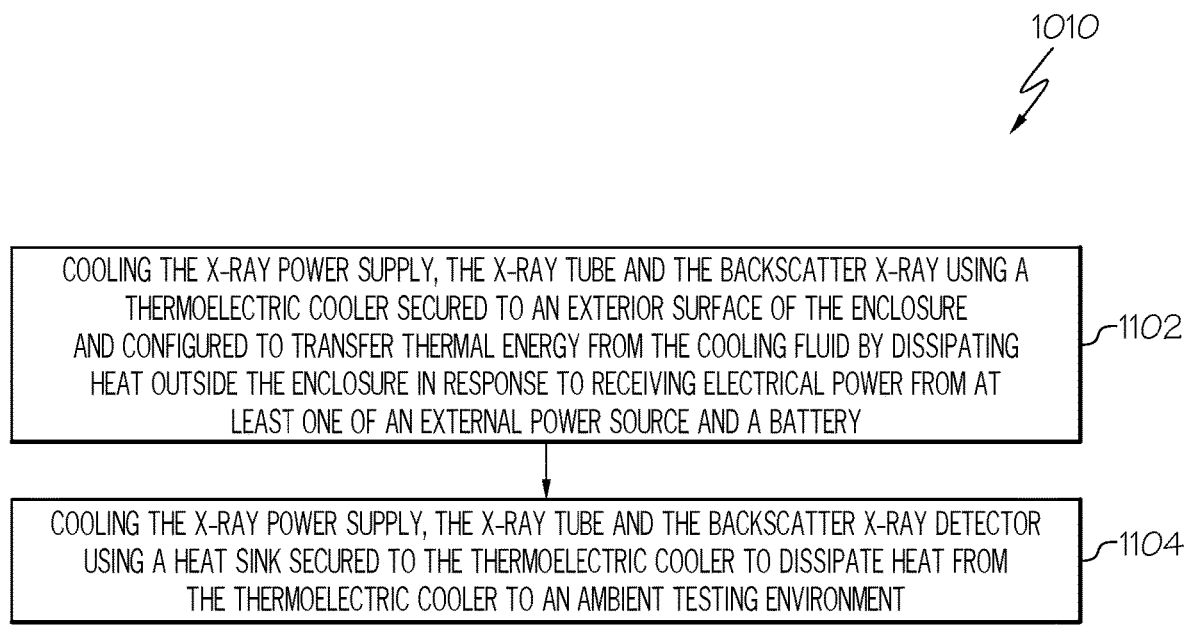
FIG. 11 is a flow diagram of an example of the cooling element for the method of FIG. 1.
Figure 12:
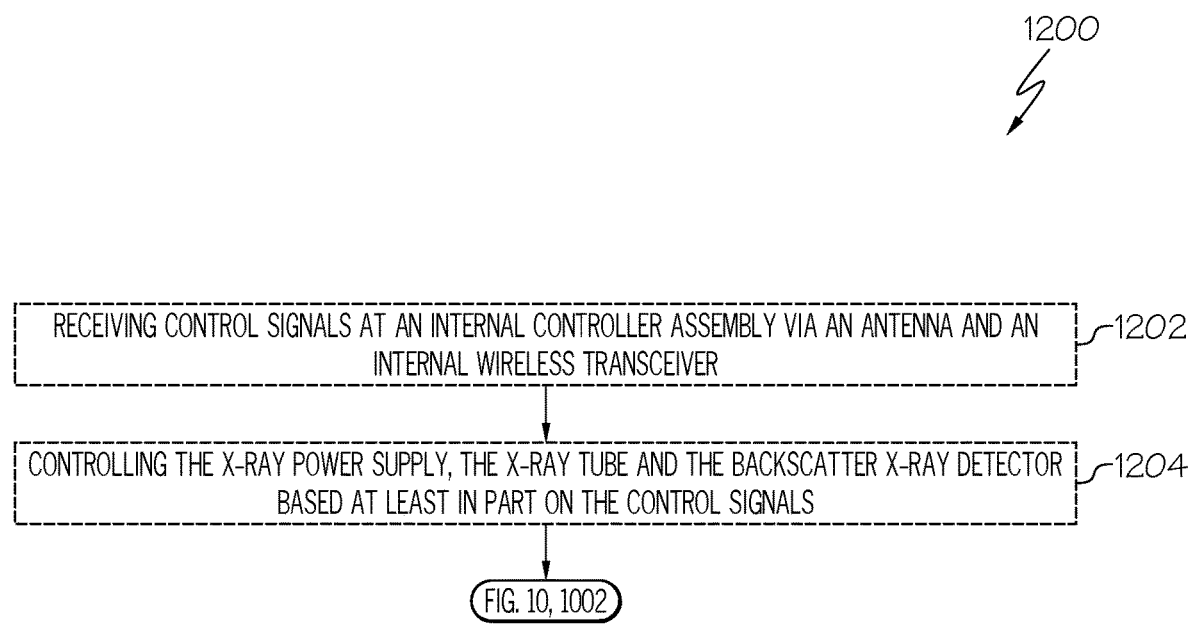
FIG. 12, in combination with FIG. 10, is a flow diagram of another example of a method for detecting backscatter X-rays reflected by a target area of an article under test.
Figure 13:
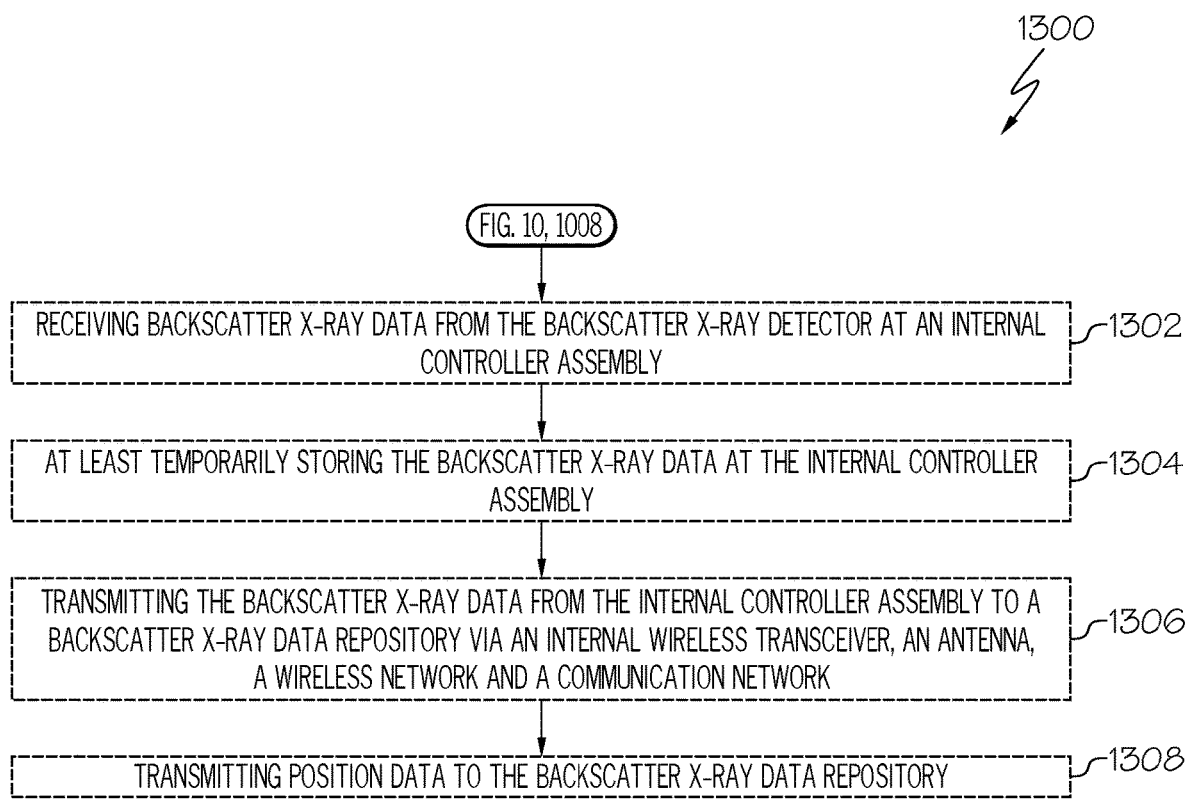
FIG. 13, in combination with FIG. 10, is a flow diagram of yet another example of a method for detecting backscatter X-rays reflected by a target area of an article under test.
Figure 14:
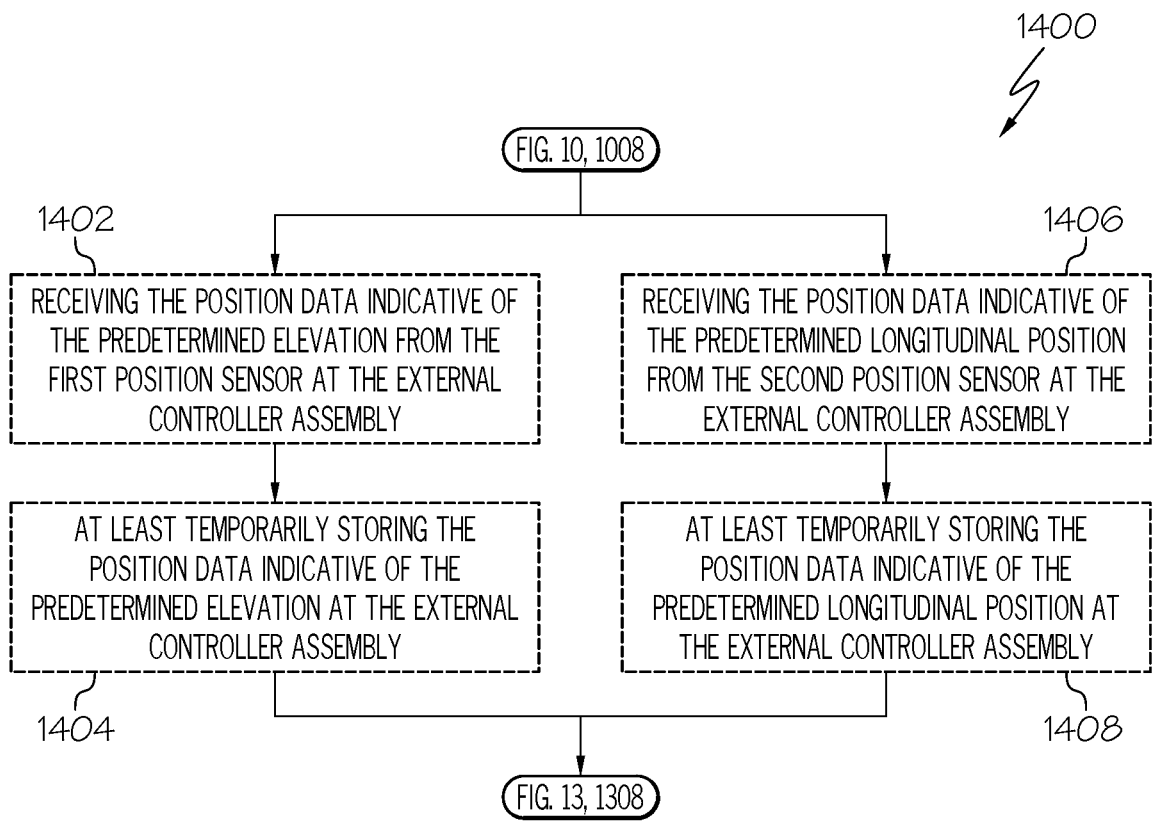
FIG. 14, in combination with FIGS. 10 and 13, is a flow diagram of still another example of a method for detecting backscatter X-rays reflected by a target area of an article under test.
Figure 15:
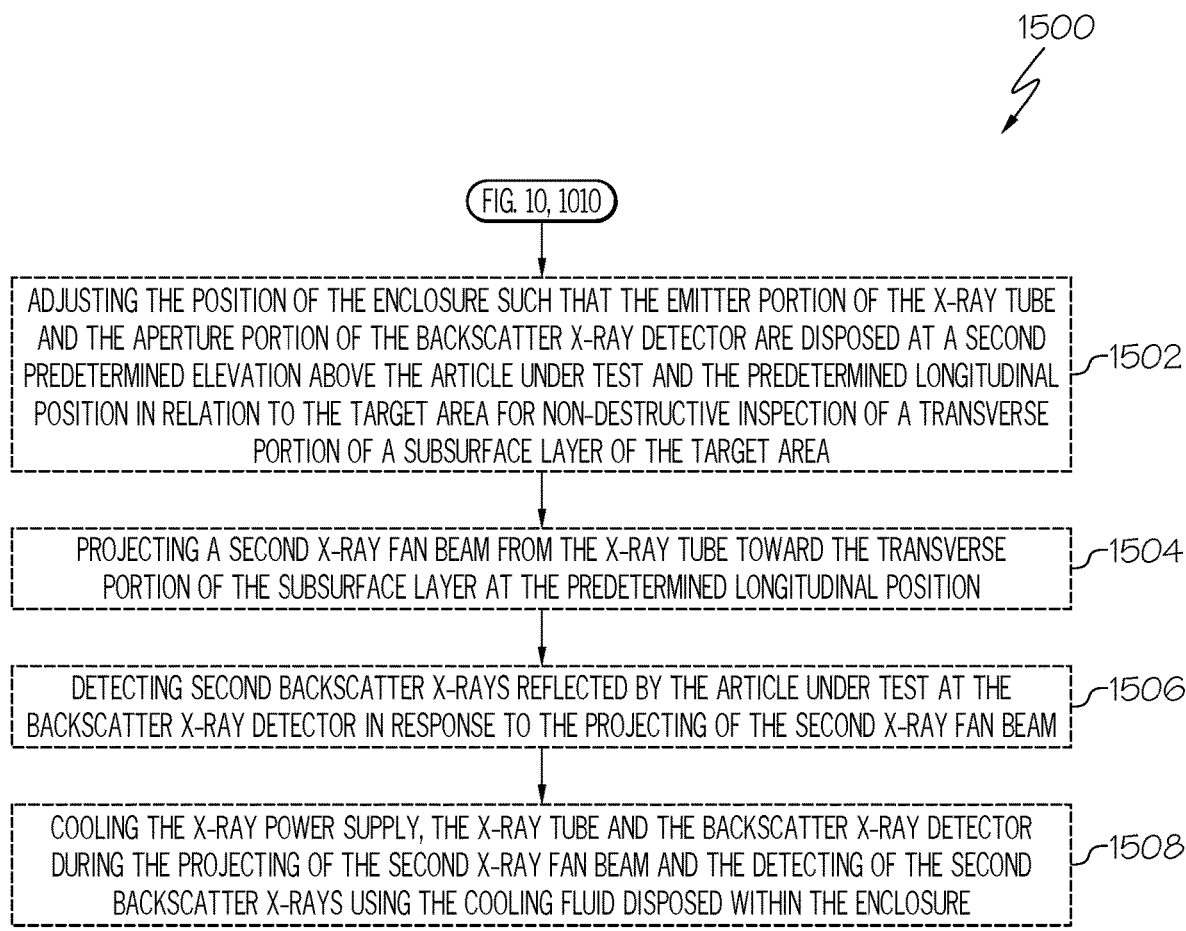
FIG. 15, in combination with FIG. 10, is a flow diagram of still yet another example of a method for detecting backscatter X-rays reflected by a target area of an article under test.
Figure 16:
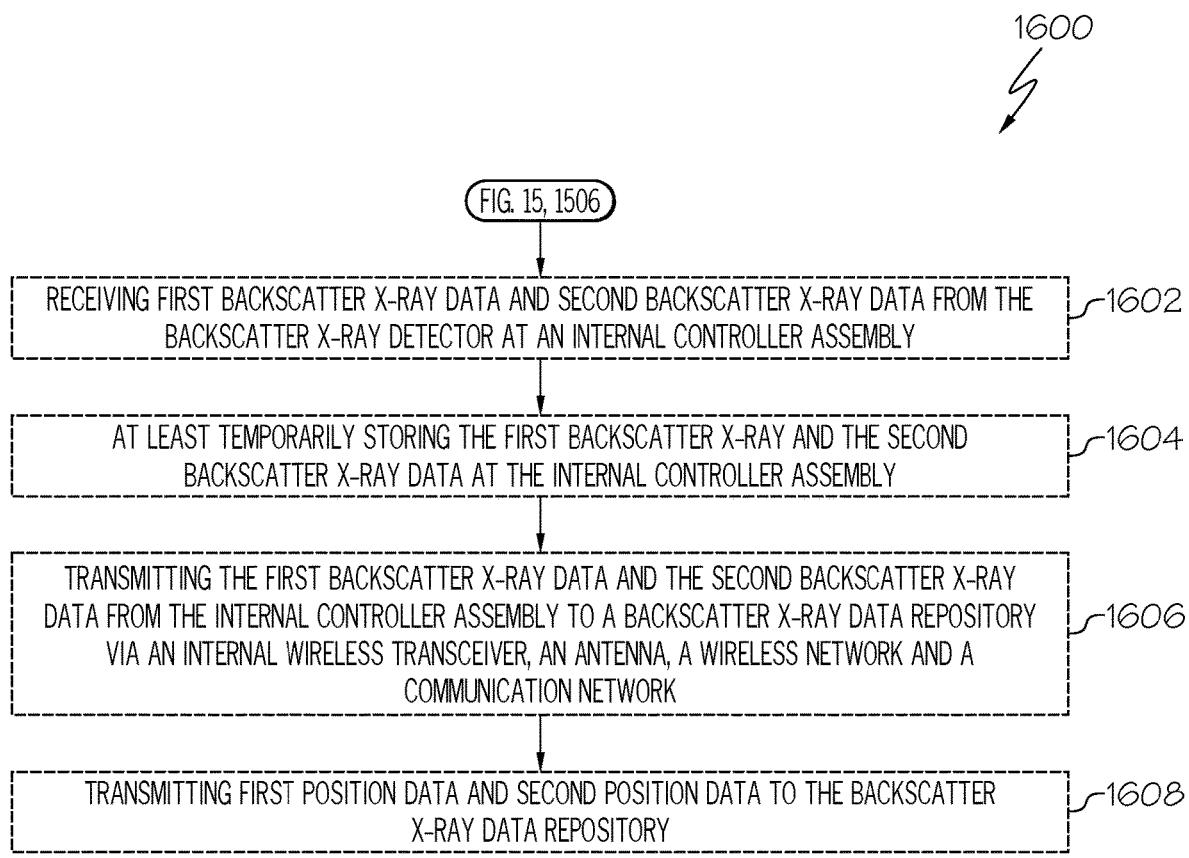
FIG. 16, in combination with FIGS. 10 and 15, is a flow diagram of another example of a method for detecting backscatter X-rays reflected by a target area of an article under test.
Figure 17:
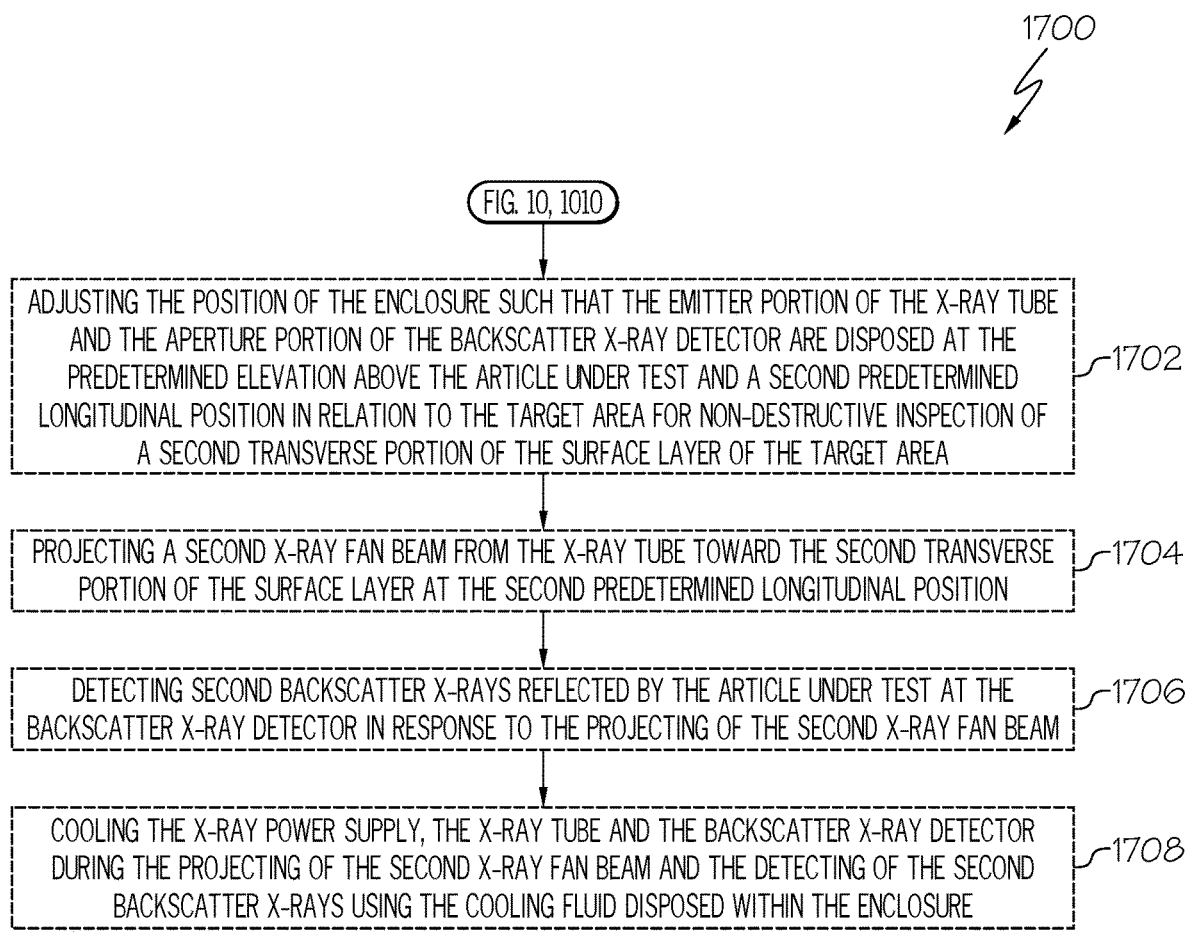
FIG. 17, in combination with FIG. 10, is a flow diagram of yet another example of a method for detecting backscatter X-rays reflected by a target area of an article under test.
Figure 18:
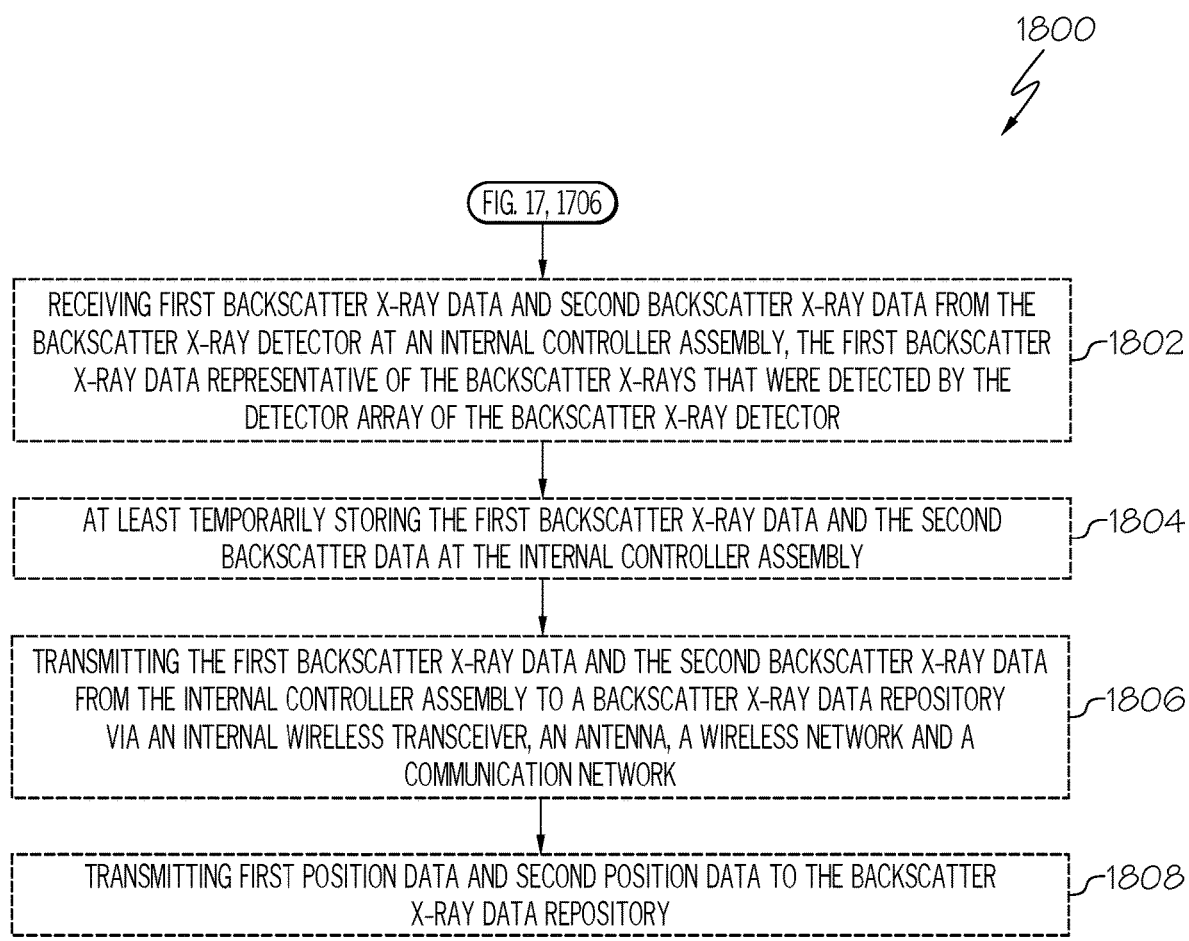
FIG. 18, in combination with FIGS. 10 and 17, is a flow diagram of still another example of a method for detecting backscatter X-rays reflected by a target area of an article under test.

FIG. 10 discloses an example of the method 1000 for detecting backscatter X-rays reflected by the target area 128 of the article under test 116. FIG. 11 discloses an example of cooling 1010 from the method 1000 of FIG. 1. FIG. 12, in combination with FIG. 10, discloses the method 1200 for detecting backscatter X-rays reflected by the target area 128 of the article under test 116. FIG. 13, in combination with FIG. 10, discloses the method 1300 for detecting backscatter X-rays reflected by the target area 128 of the article under test 116. FIG. 14, in combination with FIGS. 10 and 13, disclose the method 1400 for detecting backscatter X-rays reflected by the target area 128 of the article under test 116. FIG. 15, in combination with FIG. 10, discloses the method 1500 for detecting backscatter X-rays reflected by the target area of the article under test. FIG. 16, in combination with FIGS. 10 and 15, discloses the method 1600 for detecting backscatter X-rays reflected by the target area 128 of the article under test 116. FIG. 17, in combination with FIG. 10, discloses the method 1700 for detecting backscatter X-rays reflected by the target area 128 of the article under test 116. FIG. 18, in combination with FIGS. 10 and 17, discloses the method 1800 for detecting backscatter X-rays reflected by the target area 128 of the article under test 116.

With reference again to 1, 2A-B, 3A-B, 5A-B, 10 and 11, in one or more examples, a method 1000 (see FIG. 10) for detecting backscatter X-rays reflected by the target area 128 of the article under test 116 includes positioning 1002 an enclosure 102 relative to the target area 128 of the article under test 116. The enclosure 102 housing an X-ray power supply 104, an X-ray tube 106 operatively coupled to the X-ray power supply 104 and a backscatter X-ray detector 108. The target area 128 including a target length 202 along a longitudinal axis 204 and a target width 206 transverse to the longitudinal axis 204. The enclosure 102 including a side wall 114 facing the article under test 116. The side wall 114 including a first segment 118 and a second segment 120 that form an inverted angle 123 facing the article under test 116. The emitter portion 121 of the X-ray tube 106 disposed proximate the first segment 118 and an aperture portion 122 of the backscatter X-ray detector 108 disposed proximate the second segment 120. At 1004, a position of the enclosure 102 is adjusted such that the emitter portion 121 of the X-ray tube 106 and the aperture portion 122 of the backscatter X-ray detector 108 are disposed at a predetermined elevation 504 above the article under test 116 and a predetermined longitudinal position 506 in relation to the target area 128 for nondestructive inspection of a transverse portion of a surface layer of the target area 128. At 1006, an X-ray fan beam 124 is projected from the X-ray tube 106 toward the transverse portion of the surface layer at the predetermined longitudinal position 506. At 1008, backscatter X-rays reflected by the article under test 116 at detected at the backscatter X-ray detector 108 in response to the projecting of the X-ray fan beam 124. The backscatter X-rays that were detected having passed through the aperture portion 122 to a detector array 302 of the backscatter X-ray detector 108. At 1010, the X-ray power supply 104, the X-ray tube 106 and the backscatter X-ray detector 108 are cooled during the projecting 1006 of the X-ray fan beam 124 and the detecting 1008 of the backscatter X-rays using a cooling fluid 110 disposed within the enclosure 102. The X-ray power supply 104, the X-ray tube 106 and the backscatter X-ray detector 108 being immersed in the cooling fluid 110.

In another example of the method 1000, the X-ray fan beam 124 includes a beam length 208 that represents a fraction of the target length 202, a beam width 210 that relates to the target width 206 and a beam depth 212 representative of a depth at which backscatter X-rays reflected by the article under test 116 in response to the X-ray fan beam 124 is detectable by the backscatter X-ray detector 108. In a further example, the beam length 208 is representative of rows of pixels in the target area 128. The rows of pixels ranging from 4 rows to 10 rows. In another further example, the beam width 210 is representative of columns of pixels in the target area 128. The columns of pixels ranging from 200 columns to 600 columns. In yet another further example, the beam depth 212 is representative of a depth within the target area 128 along a Z axis 214 extending from the article under test 116 toward the enclosure 102. The beam depth 212 ranging from 4 millimeters to 10 millimeters.

In yet another example of the method 1000, the aperture portion 122 and the detector array 302 are oriented and spaced to receive at least a portion of backscatter X-rays reflected from the target area 128 of the article under test 116 in response to the projecting of the X-ray fan beam 124 from the X-ray tube 106. In a further example of the method 1000, the detector array 302 includes a plurality of direct detectors 304 arranged in multiple rows and multiple columns. In this example, detecting 1008 of the backscatter X-rays includes detecting the backscatter X-rays passed through the aperture portion 122 at the plurality of direct detectors 304 of the detector array 302. In an even further example, the multiple rows of the direct detectors 304 range from approximately 200 rows to approximately 600 rows, approximately 300 rows to approximately 500 rows, approximately 350 rows to approximately 450 rows or any other suitable range of rows. In another even further example, the multiple columns of the direct detectors 304 range from approximately 200 columns to approximately 600 columns, approximately 300 columns to approximately 500 columns, approximately 350 columns to approximately 450 columns or any other suitable range of columns.

In still another example of the method 1000, the cooling fluid 110 does not conduct electricity. In a further example, the cooling fluid 110 includes a nonconductive cooling fluid, an organic cooling fluid, a mineral oil or any other suitable cooling fluid in any suitable combination. In still yet another example of the method 1000, the cooling 1010 includes cooling 1102 the X-ray power supply 104, the X-ray tube 106 and the backscatter X-ray detector 108 using a thermoelectric cooler 130 secured to an exterior surface 132 of the enclosure 102 and configured to transfer thermal energy from the cooling fluid 110 by dissipating heat outside the enclosure 102 in response to receiving electrical power from at least one of an external power source 134 and a battery 136. In a further example, the cooling 1010 also includes cooling 1104 the X-ray power supply 104, the X-ray tube 106 and the backscatter X-ray detector 108 using a heat sink 138 secured to the thermoelectric cooler 130 to dissipate heat from the thermoelectric cooler 130 to an ambient testing environment.

With reference again to FIGS. 1, 10 and 12, in one or more examples, a method 1200 (see FIG. 12) for detecting backscatter X-rays reflected by the target area 128 of the article under test 116 includes the method 1000 of FIG. 10. The method 1200 includes receiving 1202 control signals at an internal controller assembly 140 via an antenna 144 and an internal wireless transceiver 142. At 1204, the X-ray power supply 104, the X-ray tube 106 and the backscatter X-ray detector 108 are controlled based at least in part on the control signals. The method 1200 continues from 1204 to 1002 of FIG. 10.

With reference again to FIGS. 1, 2A-B, 3A-B, 4, 5A-B, 6A-B, 8A-B, 10 and 13, a method 1300 (see FIG. 13) for detecting backscatter X-rays reflected by the target area 128 of the article under test 116 includes the method 1000 of FIG. 10. The method 1300 continues from 1008 to 1302 where backscatter X-ray data is received from the backscatter X-ray detector 108 at an internal controller assembly 140. The backscatter X-ray data representative of the backscatter X-rays that were detected by the detector array 302 of the backscatter X-ray detector 108. At 1304, the backscatter X-ray data is at least temporarily stored at the internal controller assembly 140. At 1306, the backscatter X-ray data is transmitted from the internal controller assembly 140 to a backscatter X-ray data repository 408 via an internal wireless transceiver 142, an antenna 144, a wireless network 406 and a communication network 410.

In another example, the method 1300 also includes transmitting 1308 position data to the backscatter X-ray data repository 408. The position data relating to the backscatter X-ray data and indicative of the predetermined elevation 504 and the predetermined longitudinal position 506 of the enclosure 102 at which the backscatter X-rays were detected. In a further example, a first portion of the position data that is indicative of the predetermined elevation 504 is based on a first position sensor 610 that detects movement of a movable base 502 upon which the enclosure 102 is supported, the movement detected by the first position sensor 610 being along a Z axis 214 extending from the movable base 502 toward the article under test 116. In this example, a second portion of the position data that is indicative of the predetermined longitudinal position 506 is based on a second position sensor 806 that detects movement of the movable base 502 along the longitudinal axis 204 of the target area 128. In another further example, the enclosure 102 is supported by a movable base 502 the includes a robotic arm 902 with an end effector 904 and a robot control system 906 such that the position data is transmitted to the backscatter X-ray data repository 408 from the robot control system 906.

With reference again to FIGS. 5A-B, 6A-B, 7, 8A-B, 10, 13 and 14, a method 1400 (see FIG. 14) for detecting backscatter X-rays reflected by the target area 128 of the article under test 116 includes the method 1000 of FIG. 10 and the method 1300 of FIG. 13. In method 1400, movable base 502 includes a base member 602, an elevation track 604, an actuator 606, an external controller assembly 612 and the first position sensor 610. The method 1400 continues from 1008 to 1402 where the position data indicative of the predetermined elevation 504 is received from the first position sensor 610 at the external controller assembly 612. At 1404, the position data indicative of the predetermined elevation 504 is at least temporarily stored at the external controller assembly 612. The method 1400 continues from 1404 to 1308 of FIG. 13. The method 1400 also continues from 1008 of FIGS. 10 to 1406. In this path of 1400, the movable base 502 includes a movable platform with a base member 602, a plurality of wheels 706, a drive motor 802, a drive train 804, an external controller assembly 612 and the second position sensor 806. At 1406, the position data indicative of the predetermined longitudinal position 506 is received from the second position sensor 806 at the external controller assembly 612. At 1408, the position data indicative of the predetermined longitudinal position 506 is at least temporarily stored at the external controller assembly 612. The method 1400 continues from 1408 to 1308 of FIG. 13.

With reference again to FIGS. 1, 3A-B, 5A-B, 6A-B, 10 and 15, a method 1500 (see FIG. 15) for detecting backscatter X-rays reflected by the target area 128 of the article under test 116 includes the method 1000 of FIG. 10. The method 1500 continues from 1010 to 1502 where the position of the enclosure 102 is adjusted such that the emitter portion 121 of the X-ray tube 106 and the aperture portion 122 of the backscatter X-ray detector 108 are disposed at a second predetermined elevation 608 above the article under test 116 and the predetermined longitudinal position 506 in relation to the target area 128 for nondestructive inspection of a transverse portion of a subsurface layer of the target area 128. At 1504, a second X-ray fan beam 124 is projected from the X-ray tube 106 toward the transverse portion of the subsurface layer at the predetermined longitudinal position 506. At 1506, second backscatter X-rays reflected by the article under test 116 is detected at the backscatter X-ray detector 108 in response to the projecting of the second X-ray fan beam 124. The second backscatter X-rays that were detected having passed through the aperture portion 122 to the detector array 302 of the backscatter X-ray detector 108. At 1508, the X-ray power supply 104, the X-ray tube 106 and the backscatter X-ray detector 108 are cooled during the projecting 1504 of the second X-ray fan beam 124 and the detecting 1506 of the second backscatter X-rays using the cooling fluid 110 disposed within the enclosure 102.

With reference again to FIGS. 1, 3A-B, 4, 5A-B, 6A-B, 9, 10, 15 and 16, a method 1600 (see FIG. 16) for detecting backscatter X-rays reflected by the target area 128 of the article under test 116 includes the method 1000 of FIG. 10 and the method 1500 of FIG. 15. The method 1600 continues from 1506 to 1602 where first backscatter X-ray data and second backscatter X-ray data is received from the backscatter X-ray detector 108 at an internal controller assembly

140. The first backscatter X-ray data is representative of the backscatter X-rays that were detected by the detector array 302 of the backscatter X-ray detector 108. The second backscatter X-ray data is representative of the second backscatter X-rays that were detected by the detector array 302 of the backscatter X-ray detector 108. At 1604, the first backscatter X-ray data and the second backscatter X-ray data is at least temporarily stored at the internal controller assembly 140. At 1606, the first backscatter X-ray data and the second backscatter X-ray data is transmitted from the internal controller assembly 140 to a backscatter X-ray data repository 408 via an internal wireless transceiver 142, an antenna 144, a wireless network 406 and a communication network 410. At 1608, first position data and second position data is transmitted to the backscatter X-ray data repository 408. The first position data relating to the first backscatter X-ray data and indicative of the predetermined elevation 504 and the predetermined longitudinal position 506 of the enclosure 102 at which the backscatter X-rays were detected. The second position data relating to the second backscatter X-ray data and indicative of the second predetermined elevation 608 and the predetermined longitudinal position 506 of the enclosure 102 at which the second backscatter X-rays were detected.

In another example of the method 1600, the backscatter X-ray data repository 408 is accessible to a three-dimensional reconstruction computer system 912 for reconstructing three-dimensional representations of at least a portion of the target area 128 of the article under test 116 based on the first backscatter X-ray data, the first position data, the second backscatter X-ray data and the second position data.

With reference again to FIGS. 1, 10 and 15, in another example of the method 1500, the adjusting 1502 of the position, the projecting 1504 of the second X-ray fan beam 124, the detecting 1506 of the second X-ray fan beam 124 and the cooling 1508 are repeated for additional predetermined elevations relating to nondestructive inspection of additional subsurface layers of the target area 128. In a further example, the adjusting 1502 of the position, the projecting 1504 of the second X-ray fan beam 124, the detecting 1506 of the second X-ray fan beam 124 and the cooling 1508 are repeated for additional predetermined longitudinal positions relating to nondestructive inspection of additional transvers portions of the surface layer, the subsurface layer and the additional subsurface layers of the target area 128.

With reference again to FIGS. 1, 3A-B, 5A-B, 7, 10 and 17, a method 1700 (see FIG. 17) for detecting backscatter X-rays reflected by the target area 128 of the article under test 116 includes the method 1000 of FIG. 10. The method 1700 continues from 1010 to 1702 where the position of the enclosure 102 is adjusted such that the emitter portion 121 of the X-ray tube 106 and the aperture portion 122 of the backscatter X-ray detector 108 are disposed at the predetermined elevation 504 above the article under test 116 and a second predetermined longitudinal position 704 in relation to the target area 128 for nondestructive inspection of a second transverse portion of the surface layer of the target area 128. At 1704, a second X-ray fan beam 124 is projected from the X-ray tube 106 toward the second transverse portion of the surface layer at the second predetermined longitudinal position 704. At 1706, second backscatter X-rays reflected by the article under test 116 are detected at the backscatter X-ray detector 108 in response to the projecting of the second X-ray fan beam 124. The second backscatter X-rays that were detected having passed through the aperture portion 122 to the detector array 302 of the backscatter X-ray detector 108. At 1708, the X-ray power supply 104, the X-ray tube 106 and the backscatter X-ray detector 108 are cooled during the projecting 1704 of the second X-ray fan beam 124 and the detecting 1706 of the second backscatter X-rays using the cooling fluid 110 disposed within the enclosure 102.

With reference again to FIGS. 1, 3A-B, 4, 5A-B, 7, 9, 10, 17 and 18, a method 1800 (see FIG. 18) for detecting backscatter X-rays reflected by the target area 128 of the article under test 116 includes the method 1000 of FIG. 10 and the method 1700 of FIG. 17. The method 1800 continues from 1706 to 1802 where first backscatter X-ray data and second backscatter X-ray data is received from the backscatter X-ray detector 108 at an internal controller assembly 140. The first backscatter X-ray data is representative of the backscatter X-rays that were detected by the detector array 302 of the backscatter X-ray detector 108. The second backscatter X-ray data is representative of the second backscatter X-rays that were detected by the detector array 302 of the backscatter X-ray detector 108. At 1804, the first backscatter X-ray data and the second backscatter X-ray data is at least temporarily stored at the internal controller assembly 140. At 1806, the first backscatter X-ray data and the second backscatter X-ray data is transmitted from the internal controller assembly 140 to a backscatter X-ray data repository 408 via an internal wireless transceiver 142, an antenna 144, a wireless network 406 and a communication network 410. At 1808, first position data and second position data is transmitted to the backscatter X-ray data repository 408. The first position data relating to the first backscatter X-ray data and indicative of the predetermined elevation 504 and the predetermined longitudinal position 506 of the enclosure 102 at which the backscatter X-rays were detected. The second position data relating to the second backscatter X-ray data and indicative of the predetermined elevation 504 and the second predetermined longitudinal position 704 of the enclosure 102 at which the second backscatter X-rays were detected. In a further example, the backscatter X-ray data repository 408 is accessible to a three-dimensional reconstruction computer system 912 for reconstructing three-dimensional representations of at least a portion of the target area 128 of the article under test 116 based on the first backscatter X-ray data, the first position data, the second backscatter X-ray data and the second position data.

With reference again to FIGS. 1, 10 and 17, in another example of the method 1700, the adjusting 1702 of the position, the projecting 1704 of the second X-ray fan beam 124, the detecting 1706 of the second X-ray fan beam 124 and the cooling 1708 are repeated for additional predetermined longitudinal positions relating to nondestructive inspection of additional transvers portions of the surface layer of the target area 128. In a further example, the adjusting 1702 of the position, the projecting 1704 of the second X-ray fan beam 124, the detecting 1706 of the second X-ray fan beam 124 and the cooling 1708 are repeated for additional predetermined elevations relating to nondestructive inspection of subsurface layers of the target area 128 and the additional predetermined longitudinal positions of the subsurface layers.

Referring generally to FIGS. 1, 2A-B, 4, 5A-B, 6A-B, 7, 8A-B and 9, by way of examples, the present disclosure is directed to an integrated backscatter X-ray assembly 100 for detecting backscatter X-rays reflected by a target area 128 of an article under test 116. FIG. 1 is a function block diagram of an example of the integrated backscatter X-ray assembly 100. FIGS. 2A and 2B provide top and side views of an example of the target area 128 with an example of an X-ray fan beam 124 projected from integrated backscatter X-ray assembly 100 of FIG. 1.

FIG. 4 is a functional block diagram of the integrated backscatter X-ray assembly 100 of FIG. 1 that shows an example of an internal controller assembly 140 and provides external communication paths from the internal controller assembly 140 to a an example of a computing device 402 and an example of a backscatter X-ray data repository 408. FIG. 5A provides a front view of the integrated backscatter X-ray assembly 100 of FIG. 1 positioned at a predetermined elevation from the target area 128 by an example of a movable base 502. FIG. 5B provides a side view of the integrated backscatter X-ray assembly 100 of FIG. 1 at a predetermined longitudinal position in relation to a longitudinal axis 204 of the target area 128. FIG. 6A provides a front view of another example of the integrated backscatter X-ray assembly 100 of FIG. 1 that provides a functional block diagram of an example of an external controller assembly 612 for elevation position control of the integrated backscatter X-ray assembly 100 using a base member 602, an elevation track 604 and an actuator 606 and provides external communication paths for the external controller assembly 612. FIG. 6B provides a side view of the integrated backscatter X-ray assembly 100 of FIG. 6A positioned at a predetermined longitudinal position in relation to a longitudinal axis 204 of the target area 128.

FIG. 7 is a functional block diagram of yet another example of the integrated backscatter X-ray assembly 100 of FIG. 1 supported by an example of a mobile platform 702 for translation of a track system along a longitudinal axis 204 of the target area 128 of the article under test 116. FIG. 8A provides a front view of the integrated backscatter X-ray assembly 100 of FIG. 7 that provides a functional block diagram of an example of an external controller assembly 612 for position control of the integrated backscatter X-ray assembly 100 using a drive motor 802, a drive train 804 and a mobile platform 702 and provides external communication paths from the external controller assembly 612. FIG. 8B provides a side view of the integrated backscatter X-ray assembly 100 of FIG. 7 positioned at a predetermined longitudinal position in relation to a longitudinal axis 204 of the target area 128. FIG. 9 is a functional block diagram of still another example of the integrated backscatter X-ray assembly 100 of FIG. 1 in which another example of the movable base 502 includes an example of a robotic arm 902 and an example of a robot control system 906 showing external communication paths from the robot control system 906 to a local computing device 908, a remote computing device 910 and the backscatter X-ray data repository 408.

With reference again to 1, 2A-B, 4, 5A-B, 6A-B, 7, 8A-B and 9, in one or more examples, an integrated backscatter X-ray assembly 100 for detecting backscatter X-rays reflected by a target area 128 of an article under test 116 includes an enclosure 102, an X-ray power supply 104, a backscatter X-ray detector 108, a cooling fluid 110, a movable base 502 and a mobile platform 702. The X-ray power supply 104 disposed within the enclosure 102. The X-ray tube 106 disposed within the enclosure 102 and operatively coupled to the X-ray power supply 104. The backscatter X-ray detector 108 disposed within the enclosure 102. The cooling fluid 110 disposed within the enclosure 102 such that the X-ray power supply 104, the X-ray tube 106 and the backscatter X-ray detector 108 are immersed in the cooling fluid 110. The movable base 502 supporting the enclosure 102 and configured to position the enclosure 102 in relation to the target area 128 of the article under test 116. The target area 128 includes a target length 202 along a longitudinal axis 204 and a target width 206 transverse to the longitudinal axis 204. The movable base 502 is configured to position an emitter portion 121 of the X-ray tube 106 and an aperture portion 122 of the backscatter X-ray detector 108 to a predetermined elevation 504 above the article under test 116 and a predetermined longitudinal position 506 in relation to the target area 128 for nondestructive inspection of a transverse portion of a surface layer of the target area 128. The mobile platform 702 supporting the movable base 502 and configured to change longitudinal positions of the enclosure 102 along the longitudinal axis 204 in relation to the article under test 116 to position the emitter portion 121 of the X-ray tube 106 and the aperture portion 122 of the backscatter X-ray detector 108 to a second predetermined longitudinal position 704 for nondestructive inspection of a second transverse portion of the surface layer of the target area 128.

In another example of the integrated backscatter X-ray assembly 100, the X-ray tube 106 and the backscatter X-ray detector 108 are oriented within the enclosure 102 such that an X-ray fan beam 124 generated by the X-ray power supply 104 and the X-ray tube 106 and a field of view 126 for the backscatter X-ray detector 108 intersect at the target area 128 of the article under test 116.

In yet another example, the integrated backscatter X-ray assembly 100 also includes an internal controller assembly 140, an internal wireless transceiver 142 and an antenna 144. The internal controller assembly 140 disposed within the enclosure 102 and in operative communication with the X-ray power supply 104, the X-ray tube 106 and the backscatter X-ray detector 108 in response to receiving electrical power from at least one of an external power source 134 and a battery 136. The internal wireless transceiver 142 is disposed within the enclosure 102 and in operative communication with the internal controller assembly 140. The antenna 144 secured to an exterior surface 132 of the enclosure 102 and in operative communication with the internal wireless transceiver 142. The internal controller assembly 140, the internal wireless transceiver 142 and the antenna 144 are configured to transmit backscatter X-ray data and position data to a backscatter X-ray data repository 408 accessible via a wireless network 406 and a communication network 410. In a further example, the backscatter X-ray data repository 408 is accessible to a three-dimensional reconstruction computer system 912 for reconstructing three-dimensional representations of at least a portion of the target area 128 of the article under test 116 based on the backscatter X-ray data and the position data.

In still another example of the integrated backscatter X-ray assembly 100, the movable base 502 includes a base member 602, an elevation track 604, an actuator 606, a position sensor 610, an external controller assembly 612, an external wireless transceiver 614 and an antenna 144. The base member 602 supporting the enclosure 102. The elevation track 604 movably coupled to the base member 602 and defining a Z axis 214 extending from the movable base 502 toward the article under test 116. The actuator 606 attached to the elevation track 604 and the base member 602. The actuator 606 configured to change elevations of the enclosure 102 in relation to the article under test 116 to move the emitter portion 121 of the X-ray tube 106 and the aperture portion 122 of the backscatter X-ray detector 108 along the Z axis 214 to a second predetermined elevation 608 closer to the article under test 116 for nondestructive inspection of a subsurface layer of the target area 128. The position sensor 610 configured to detect movement of at least one of the actuator 606, the movable base 502 and the enclosure 102. The external controller assembly 612 is in operative communication with the actuator 606 and the position sensor 610 to control movement of the enclosure 102 along the Z axis 214. The external wireless transceiver 614 is in operative communication with the external controller assembly 612. The antenna 144 secured to the enclosure 102 and in operative communication with the external wireless transceiver 614.

In still yet another example of the integrated backscatter X-ray assembly 100, the mobile platform 702 includes a base member 602, a plurality of wheels 706, a drive motor 802, a drive train 804, a position sensor 806, an external controller assembly 612, an external wireless transceiver 614 and an antenna 144. The base member 602 supporting the enclosure 102. The plurality of wheels 706 rotatably attached to the base member 602. The drive motor 802 configured to selectively power movement of the mobile platform 702. The drive train 804 coupling the drive motor 802 to one or more wheel 706 of the plurality of wheels 706 for movement of the mobile platform 702 in response to operation of the drive motor 802. The position sensor 806 is configured to detect movement of at least one of the drive motor 802, the drive train 804 and the one or more wheel 706. The external controller assembly 612 is in operative communication with the drive motor 802 and the position sensor 806 to control movement of the mobile platform 702 along the longitudinal axis 204. The external wireless transceiver 614 is in operative communication with the external controller assembly 612. The antenna 144 secured to the enclosure 102 and in operative communication with the external wireless transceiver 614.

Examples of the integrated backscatter X-ray assembly 100 and methods 1000, 1200, 1300, 1400, 1500, 1600, 1700, 1800 may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the detecting of backscatter X-rays reflected by a target area of an aircraft and/or its components and other equipment in various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component or hardware "configured to" perform a specified function is indeed capable of performing the specified function without any alteration, rather than merely having potential to perform the specified function after further modification. In other words, the system, apparatus, device, structure, article, element, component or hardware "configured to" perform a specified function is specifically selected, created, implemented, utilized, programmed and/or designed for the purpose of performing the specified function. As used herein, "configured to" denotes existing characteristics of a system, apparatus, structure, article, element, component or hardware that enable the system, apparatus, structure, article, element, component or hardware to perform the specified function without further modification. For purposes of this disclosure, a system, apparatus, device, structure, article, element, component or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1, 2A-B, 3A-B, 4, 5A-B, 6A-B, 7, 8A-B and 9, referred to above, may represent functional elements, features or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1, 2A-B, 3A-B, 4, 5A-B, 6A-B, 7, 8A-B and 9, referred to above, need be included in every example and not all elements, features and/or components described herein are necessarily depicted in each illustrative example. Accordingly, some of the elements, features and/or components described and illustrated in FIGS. 1, 2A-B, 3A-B, 4, 5A-B, 6A-B, 7, 8A-B and 9 may be combined in various ways without the need to include other features described and illustrated in FIGS. 1, 2A-B, 3A-B, 4, 5A-B, 6A-B. 7, 8A-B and 9, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1, 2A-B, 3A-B, 4, 5A-B, 6A-B, 7, 8A-B and 9, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1, 2A-B, 3A-B, 4, 5A-B, 6A-B, 7, 8A-B and 9 and such elements, features and/or components may not be discussed in detail herein with reference to each of FIGS. 1, 2A-B, 3A-B, 4, 5A-B, 6A-B, 7, 8A-B and 9. Similarly, all elements, features and/or components may not be labeled in each of FIGS. 1, 2A-B, 3A-B, 4, 5A-B, 6A-B, 7, 8A-B and 9, but reference numerals associated therewith may be utilized herein for consistency.

In FIGS. 10-18, referred to above, the blocks may represent operations, steps and/or portions thereof, and lines connecting the various blocks do not imply any particular order or dependency of the operations or portions thereof. It will be understood that not all dependencies among the various disclosed operations are necessarily represented. FIGS. 10-18 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage or characteristic described in connection with an example is included in at least one example. Thus, discussion of features, advantages and similar language used throughout the present disclosure may, but does not necessarily, refer to the same example.

Figure 19:
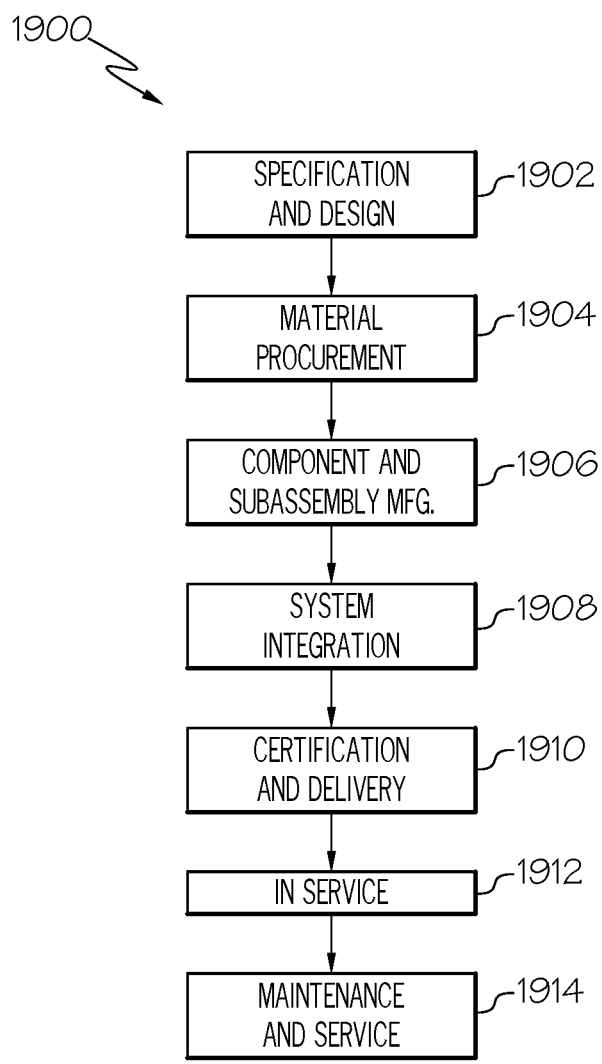
FIG. 19 is a block diagram of an example of an aircraft production and service methodology that implements one or more of the examples of methods for detecting backscatter X-rays reflected by a target area of an article under test disclosed herein.
Figure 20:
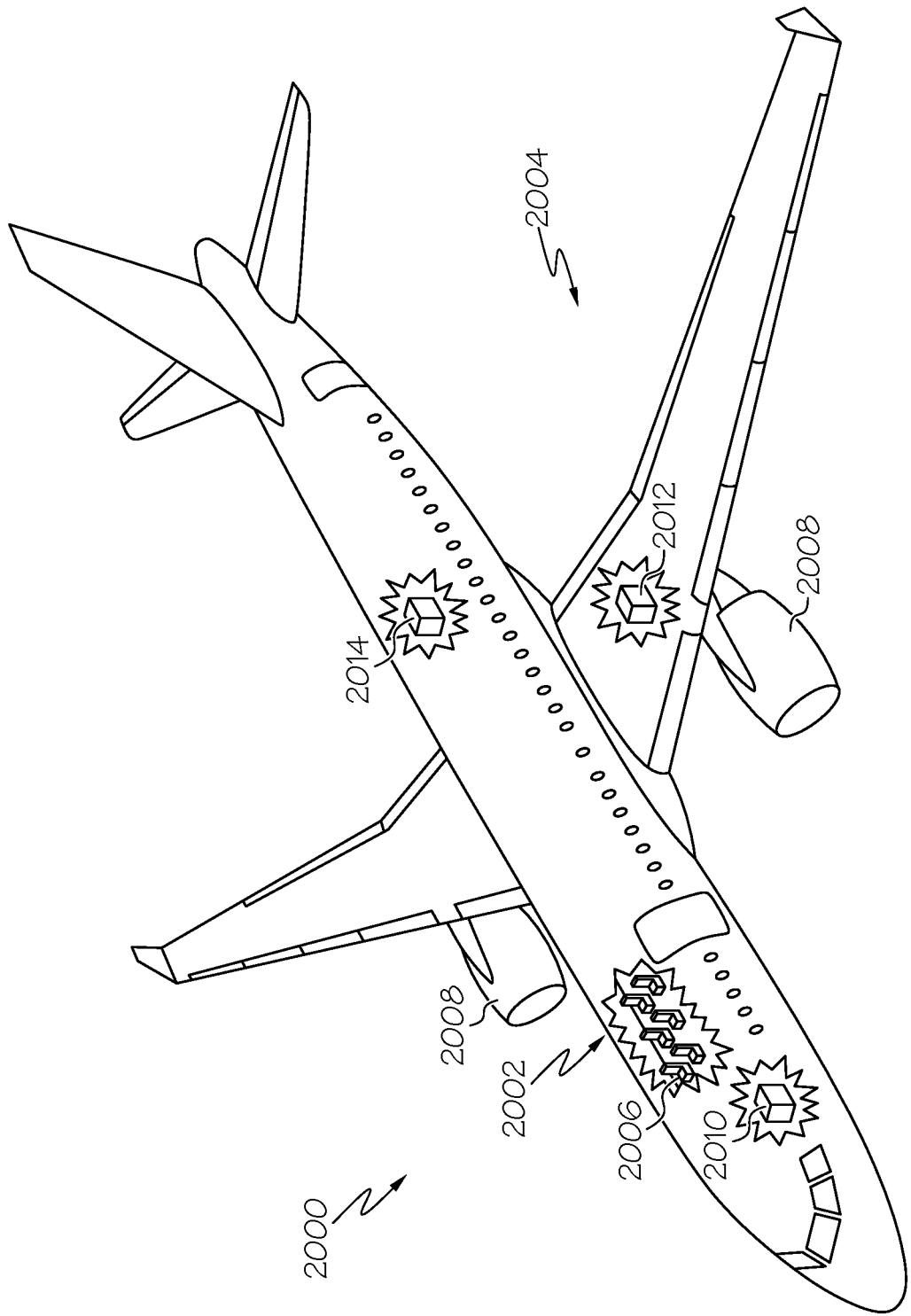
FIG. 20 is a schematic illustration of an example of an aircraft that includes various components subjected to testing using the integrated backscatter X-ray assemblies and associated methods disclosed herein.

Examples of the subject matter disclosed herein may be described in the context of aircraft manufacturing and service method 1900 as shown in FIG. 19 and aircraft 2000 as shown in FIG. 20. In one or more examples, the disclosed assemblies and methods for nondestructive inspection of an article under test may be used in aircraft manufacturing. During pre-production, the service method 1900 may include specification and design (block 1902) of aircraft 2000 and material procurement (block 1904). During production, component and subassembly manufacturing (block 1906) and system integration (block 1908) of aircraft 2000 may take place. Thereafter, aircraft 2000 may go through certification and delivery (block 1910) to be placed in service (block 1912). While in service, aircraft 2000 may be scheduled for routine maintenance and service (block 1914). Routine maintenance and service may include modification, reconfiguration, refurbishment, etc. of one or more systems of aircraft 2000.

Each of the processes of the service method 1900 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 20, aircraft 2000 produced by the service method 1900 may include airframe 2002 with a plurality of high-level systems 2004 and interior 2006. Examples of high-level systems 2004 include one or more of propulsion system 2008, electrical system 2010, hydraulic system 2012 and environmental system 2014. Any number of other systems may be included. Although an aerospace example is shown, the principles disclosed herein may be applied to other industries, such as the automotive industry. Accordingly, in addition to aircraft 2000, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 1900. For example, components or subassemblies corresponding to component and subassembly manufacturing (block 1906) may be fabricated or manufactured in a manner similar to components or subassemblies produced while aircraft 2000 is in service (block 1912). Also, one or more examples of the system(s), method(s) or combination thereof may be utilized during production stages (block 1906 and block 1908), for example, by substantially expediting assembly of or reducing the cost of aircraft 2000. Similarly, one or more examples of the system or method realizations or a combination thereof, may be utilized, for example and without limitation, while aircraft 2000 is in service (block 1912) and/or during maintenance and service (block 1914).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the integrated backscatter X-ray assemblies 100 and methods 1000, 1200, 1300, 1400, 1500, 1600, 1700, 1800 have been shown and described, modifications may occur to those skilled in the art upon reading the specification. The present application includes such modifications and is limited only by the scope of the claims.

What is claimed is:

1. An integrated backscatter X-ray assembly for detecting backscatter X-rays reflected by a target area of an article under test, comprising:
   an enclosure;
   an X-ray power supply disposed within the enclosure;
   an X-ray tube disposed within the enclosure and operatively coupled to the X-ray power supply;
   a backscatter X-ray detector disposed within the enclosure; and
   a cooling fluid disposed within the enclosure such that the X-ray power supply, the X-ray tube and the backscatter X-ray detector are immersed in the cooling fluid.

2. The integrated backscatter X-ray assembly of claim 1 wherein the enclosure comprises a side wall configured to face the article under test, the side wall comprising a first segment and a second segment that form an inverted angle configured to face the article under test, an emitter portion of the X-ray tube disposed proximate the first segment and an aperture portion of the backscatter X-ray detector disposed proximate the second segment.

3. The integrated backscatter X-ray assembly of claim 1 wherein the X-ray tube and the backscatter X-ray detector are oriented within the enclosure such that an X-ray fan beam generated by the X-ray power supply and the X-ray tube and a field of view for the backscatter X-ray detector intersect at the target area of the article under test.

4. The integrated backscatter X-ray assembly of claim 1, the backscatter X-ray detector comprising:
   an aperture portion configured to pass through at least a portion of backscatter X-rays reflected from the target area of the article under test in response to an X-ray fan beam generated by the X-ray power supply and the X-ray tube; and
   a detector array configured to detect the portion of the backscatter that passed through the aperture portion.

5. The integrated backscatter X-ray assembly of claim 1, further comprising:
   a thermoelectric cooler secured to an exterior surface of the enclosure and configured to transfer thermal energy from the cooling fluid by dissipating heat outside the enclosure in response to receiving electrical power from at least one of an external power source and a battery.

6. The integrated backscatter X-ray assembly of claim 1, further comprising:
   an internal controller assembly disposed within the enclosure and in operative communication with the X-ray power supply, the X-ray tube and the backscatter X-ray detector in response to receiving electrical power from at least one of an external power source and a battery;
   an internal wireless transceiver disposed within the enclosure and in operative communication with the internal controller assembly; and
   an antenna secured to an exterior surface of the enclosure and in operative communication with the internal wireless transceiver.

7. The integrated backscatter X-ray assembly of claim 6 wherein the internal controller assembly, the internal wireless transceiver and the antenna are configured to transmit backscatter X-ray data to a backscatter X-ray data repository accessible via a wireless network and a communication network.

8. The integrated backscatter X-ray assembly of claim 1, wherein the target area comprises a target length along a longitudinal axis and a target width transverse to the longitudinal axis, the integrated backscatter X-ray assembly further comprising:
   a movable base supporting the enclosure and configured to position the enclosure in relation to the target area of the article under test,
   wherein the X-ray tube and the backscatter X-ray detector are oriented within the enclosure such that an X-ray fan beam generated by the X-ray power supply and the X-ray tube and a field of view for the backscatter X-ray detector intersect at the target area of the article under test,
   wherein the movable base is configured to position an emitter portion of the X-ray tube and an aperture portion of the backscatter X-ray detector to a predetermined elevation above the article under test and a predetermined longitudinal position in relation to the target area for nondestructive inspection of a transverse portion of a surface layer of the target area.

9. The integrated backscatter X-ray assembly of claim 8, the movable base comprising:
   a base member supporting the enclosure;
   an elevation track movably coupled to the base member and defining a Z axis extending from the movable base toward the article under test;
   an actuator attached to the elevation track and the base member, the actuator configured to change elevations of the enclosure in relation to the article under test to move the emitter portion of the X-ray tube and the aperture portion of the backscatter X-ray detector along the Z axis to a second predetermined elevation closer to the article under test for nondestructive inspection of a subsurface layer of the target area;
   a position sensor configured to detect movement of at least one of the actuator, the movable base and the enclosure;
   an external controller assembly in operative communication with the actuator and the position sensor to control movement of the enclosure along the Z axis;
   an external wireless transceiver in operative communication with the external controller assembly; and
   an antenna secured to the enclosure and in operative communication with the external wireless transceiver.

10. The integrated backscatter X-ray assembly of claim 9 wherein the actuator is configured to move the enclosure closer to the article under test to position the emitter portion of the X-ray tube and the aperture portion of the backscatter X-ray detector to additional predetermined elevations relating to nondestructive inspection of additional subsurface layers of the target area.

11. The integrated backscatter X-ray assembly of claim 9 wherein the external controller assembly, the external wireless transceiver and the antenna are configured to transmit position data from the position sensor to a backscatter X-ray data repository in conjunction with control of the actuator, the backscatter X-ray data repository accessible via a wireless network and a communication network.

12. The integrated backscatter X-ray assembly of claim 8, the movable base comprising:
a mobile platform configured to change longitudinal positions of the enclosure along the longitudinal axis in relation to the article under test to position the emitter portion of the X-ray tube and the aperture portion of the backscatter X-ray detector to a second predetermined longitudinal position for nondestructive inspection of a second transverse portion of the surface layer of the target area.

13. The integrated backscatter X-ray assembly of claim 12 wherein the mobile platform is configured to move the enclosure along the longitudinal axis of the target area of the article under test to position the emitter portion of the X-ray tube and the aperture portion of the backscatter X-ray detector to additional predetermined longitudinal positions relating to nondestructive inspection of additional transvers portions of the surface layer of the target area.

14. The integrated backscatter X-ray assembly of claim 12, the mobile platform comprising:
a base member supporting the enclosure;
a plurality of wheels rotatably attached to the base member;
a drive motor configured to selectively power movement of the mobile platform;
a drive train coupling the drive motor to one or more wheel of the plurality of wheels for movement of the mobile platform in response to operation of the drive motor;
a position sensor configured to detect movement of at least one of the drive motor, the drive train and the one or more wheel;
an external controller assembly in operative communication with the drive motor and the position sensor to control movement of the mobile platform along the longitudinal axis;
an external wireless transceiver in operative communication with the external controller assembly; and
an antenna secured to the enclosure and in operative communication with the external wireless transceiver.

15. The integrated backscatter X-ray assembly of claim 8, the movable base comprising:
a robotic arm with an end effector supporting the enclosure; and
a robot control system in operative communication with the robotic arm,
wherein the robot control system and the robotic arm are configured to change elevations of the enclosure in relation to the article under test to move the emitter portion of the X-ray tube and the aperture portion of the backscatter X-ray detector along a Z axis to a second predetermined elevation closer to the article under test for nondestructive inspection of a subsurface layer of the target area, and
wherein the robot control system and the robotic arm are configured to change longitudinal positions of the enclosure along the longitudinal axis in relation to the article under test to position the emitter portion of the X-ray tube and the aperture portion of the backscatter X-ray detector to a second predetermined longitudinal position for nondestructive inspection of a second transverse portion of the surface layer of the target area.

16. The integrated backscatter X-ray assembly of claim 15 wherein the robot control system and the robotic arm are configured to move the enclosure closer to the article under test to position the emitter portion of the X-ray tube and the aperture portion of the backscatter X-ray detector to additional predetermined elevations relating to nondestructive inspection of additional subsurface layers of the target area.

17. The integrated backscatter X-ray assembly of claim 15 wherein the robot control system is configured to transmit position data relating to the predetermined elevation and the predetermined longitudinal position of the enclosure to a backscatter X-ray data repository in conjunction with control of the robotic arm.

18. The integrated backscatter X-ray assembly of claim 15 wherein the robot control system is configured to move the enclosure along the longitudinal axis of the target area of the article under test to position the emitter portion of the X-ray tube and the aperture portion of the backscatter X-ray detector to additional predetermined longitudinal positions relating to nondestructive inspection of additional transvers portions of the surface layer of the target area.

19. A method for detecting backscatter X-rays reflected by a target area of an article under test, comprising:
positioning an enclosure relative to the target area of the article under test, the enclosure housing an X-ray power supply, an X-ray tube operatively coupled to the X-ray power supply and a backscatter X-ray detector, the target area comprising a target length along a longitudinal axis and a target width transverse to the longitudinal axis, the enclosure comprising a side wall facing the article under test, the side wall comprising a first segment and a second segment that form an inverted angle facing the article under test, an emitter portion of the X-ray tube disposed proximate the first segment and an aperture portion of the backscatter X-ray detector disposed proximate the second segment;
adjusting a position of the enclosure such that the emitter portion of the X-ray tube and the aperture portion of the backscatter X-ray detector are disposed at a predetermined elevation above the article under test and a predetermined longitudinal position in relation to the target area for nondestructive inspection of a transverse portion of a surface layer of the target area;
projecting an X-ray fan beam from the X-ray tube toward the transverse portion of the surface layer at the predetermined longitudinal position;
detecting backscatter X-rays reflected by the article under test at the backscatter X-ray detector in response to the projecting of the X-ray fan beam, the backscatter X-rays that were detected having passed through the aperture portion to a detector array of the backscatter X-ray detector; and
cooling the X-ray power supply, the X-ray tube and the backscatter X-ray detector during the projecting of the X-ray fan beam and the detecting of the backscatter X-rays using a cooling fluid disposed within the enclosure, the X-ray power supply, the X-ray tube and the backscatter X-ray detector being immersed in the cooling fluid.

20. An integrated backscatter X-ray assembly for detecting backscatter X-rays reflected by a target area of an article under test, comprising:
an enclosure;
an X-ray power supply disposed within the enclosure;

an X-ray tube disposed within the enclosure and operatively coupled to the X-ray power supply;

a backscatter X-ray detector disposed within the enclosure;

a cooling fluid disposed within the enclosure such that the X-ray power supply, the X-ray tube and the backscatter X-ray detector are immersed in the cooling fluid;

a movable base supporting the enclosure and configured to position the enclosure in relation to the target area of the article under test, wherein the target area comprises a target length along a longitudinal axis and a target width transverse to the longitudinal axis, wherein the movable base is configured to position an emitter portion of the X-ray tube and an aperture portion of the backscatter X-ray detector to a predetermined elevation above the article under test and a predetermined longitudinal position in relation to the target area for nondestructive inspection of a transverse portion of a surface layer of the target area; and a mobile platform supporting the movable base and configured to change longitudinal positions of the enclosure along the longitudinal axis in relation to the article under test to position the emitter portion of the X-ray tube and the aperture portion of the backscatter X-ray detector to a second predetermined longitudinal position for nondestructive inspection of a second transverse portion of the surface layer of the target area.

* * * * *